(12) United States Patent
Mehta

(10) Patent No.: US 12,081,628 B1
(45) Date of Patent: *Sep. 3, 2024

(54) ACCOUNT ASSOCIATION FOR VOICE-ENABLED DEVICES

(71) Applicant: Amazon Technologies, Inc., Seattle, WA (US)

(72) Inventor: Anand Kishor Mehta, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 436 days.

This patent is subject to a terminal disclaimer.

(21) Appl. No.: 17/384,919

(22) Filed: Jul. 26, 2021

Related U.S. Application Data

(63) Continuation of application No. 16/121,071, filed on Sep. 4, 2018, now Pat. No. 11,076,018.

(51) Int. Cl.
| | |
|---|---|
| *H04L 67/306* | (2022.01) |
| *G10L 15/18* | (2013.01) |
| *G10L 15/22* | (2006.01) |
| *H04L 9/40* | (2022.01) |

(52) U.S. Cl.
CPC ........ *H04L 67/306* (2013.01); *G10L 15/1815* (2013.01); *G10L 15/22* (2013.01); *H04L 63/0428* (2013.01); *G10L 2015/223* (2013.01)

(58) Field of Classification Search
CPC ... H04L 67/306; H04L 63/0428; G10L 15/22; G10L 15/1815; G10L 2015/223
See application file for complete search history.

(56) References Cited

U.S. PATENT DOCUMENTS

| | | | |
|---|---|---|---|
| 5,544,321 A | | 8/1996 | Theimer et al. |
| 7,020,639 B1 * | | 3/2006 | Slater .................. G06Q 20/401 |
| | | | 379/93.12 |
| 8,407,768 B1 | | 3/2013 | Hayter |
| 10,231,128 B1 | | 3/2019 | Ziraknejad et al. |
| 2002/0049733 A1 * | | 4/2002 | Orlick .................. G06Q 10/109 |

(Continued)

FOREIGN PATENT DOCUMENTS

| | | | | |
|---|---|---|---|---|
| CN | 105379409 | | 3/2016 | |
| EP | 3100204 B1 * | | 3/2019 | ............. G06F 21/62 |

(Continued)

OTHER PUBLICATIONS

Office Action for U.S. Appl. No. 16/121,071, mailed on Sep. 17, 2020, Mehta, "Account Association for Voice-Enabled Devices", 12 Pages.

(Continued)

*Primary Examiner* — John B King
(74) *Attorney, Agent, or Firm* — Lee & Hayes, P.C.

(57) ABSTRACT

Systems and methods for account association with voice-enabled devices are disclosed. For example, a voice-enabled device situated in a managed environment, such as a hotel room, may be taken by a temporary resident or guest of the environment. Upon determining that the device has been removed from the environment, a device identifier associated with the device may be dissociated from components and/or services associated with environment and/or systems related thereto, and the device identifier may be associated with a user account of the user.

20 Claims, 10 Drawing Sheets

(56) References Cited

U.S. PATENT DOCUMENTS

| | | | |
|---|---|---|---|
| 2003/0135438 A1* | 7/2003 | Blagg | G06Q 20/24 705/35 |
| 2005/0076242 A1 | 4/2005 | Breuer | |
| 2005/0086126 A1* | 4/2005 | Patterson | G06Q 30/0633 705/26.1 |
| 2005/0228679 A1* | 10/2005 | King | G06Q 40/02 705/40 |
| 2006/0006226 A1* | 1/2006 | Fitzgerald | H04W 12/06 235/380 |
| 2008/0228615 A1* | 9/2008 | Scipioni | G06Q 20/10 705/35 |
| 2011/0305337 A1 | 12/2011 | Devol et al. | |
| 2012/0330837 A1* | 12/2012 | Persaud | G06Q 20/20 705/44 |
| 2013/0204925 A1* | 8/2013 | McDougall | G06F 21/45 709/203 |
| 2014/0208112 A1 | 7/2014 | McDonald et al. | |
| 2014/0282045 A1 | 9/2014 | Ayanam et al. | |
| 2015/0026551 A1* | 1/2015 | Schmidt | H04L 67/306 715/205 |
| 2015/0180836 A1* | 6/2015 | Wong | G06Q 20/326 713/172 |
| 2015/0286813 A1 | 10/2015 | Jakobsson | |
| 2016/0005001 A1* | 1/2016 | Muhammedali | G06Q 50/01 705/319 |
| 2016/0094678 A1* | 3/2016 | Kumar | H04L 65/60 709/219 |
| 2016/0271490 A1 | 9/2016 | Tamura et al. | |
| 2017/0076720 A1* | 3/2017 | Gopalan | G10L 15/22 |
| 2017/0359334 A1 | 12/2017 | Maddox et al. | |
| 2018/0131683 A1 | 5/2018 | Woodward et al. | |
| 2018/0351956 A1 | 12/2018 | Verma | |
| 2019/0005491 A1* | 1/2019 | Grassadonia | G06Q 20/42 |
| 2019/0028781 A1 | 1/2019 | Bigio et al. | |
| 2019/0129954 A1* | 5/2019 | Williams | G06Q 30/02 |
| 2019/0253416 A1 | 8/2019 | Derakhshani | |
| 2019/0378499 A1* | 12/2019 | Miller | G10L 15/22 |
| 2019/0378500 A1* | 12/2019 | Miller | G06F 3/167 |
| 2020/0228521 A1 | 7/2020 | Edwards et al. | |
| 2020/0410028 A1* | 12/2020 | Shaabani | G06F 21/564 |
| 2022/0019995 A1* | 1/2022 | Ngo | G06Q 20/385 |

FOREIGN PATENT DOCUMENTS

| | | |
|---|---|---|
| WO | WO2014104507 | 7/2014 |
| WO | WO2018136081 | 7/2018 |

OTHER PUBLICATIONS

"Restore your iPhone, iPad, or iPod touch from a backup", retreived on Sep. 13, 2020, at << https://support.apple.com/en-US/HT204184>>, Aug. 2008, 4 pgs.

* cited by examiner

ACCOUNT ASSOCIATION FOR VOICE-ENABLED DEVICES

RELATED APPLICATIONS

This application claims priority to and is a continuation of U.S. patent application Ser. No. 16/121,071, filed on Sep. 4, 2018, the entire contents of which are incorporated herein by reference.

BACKGROUND

Voice-enabled devices may be used in environments where users reside temporarily, such as hotel rooms. Guests in such environments may desire to take the voice-enabled devices with them for future use when departing the environments. Described herein are improvements in technology and solutions to technical problems that can be used to, among other things, increase the availability of voice-enabled devices for users.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
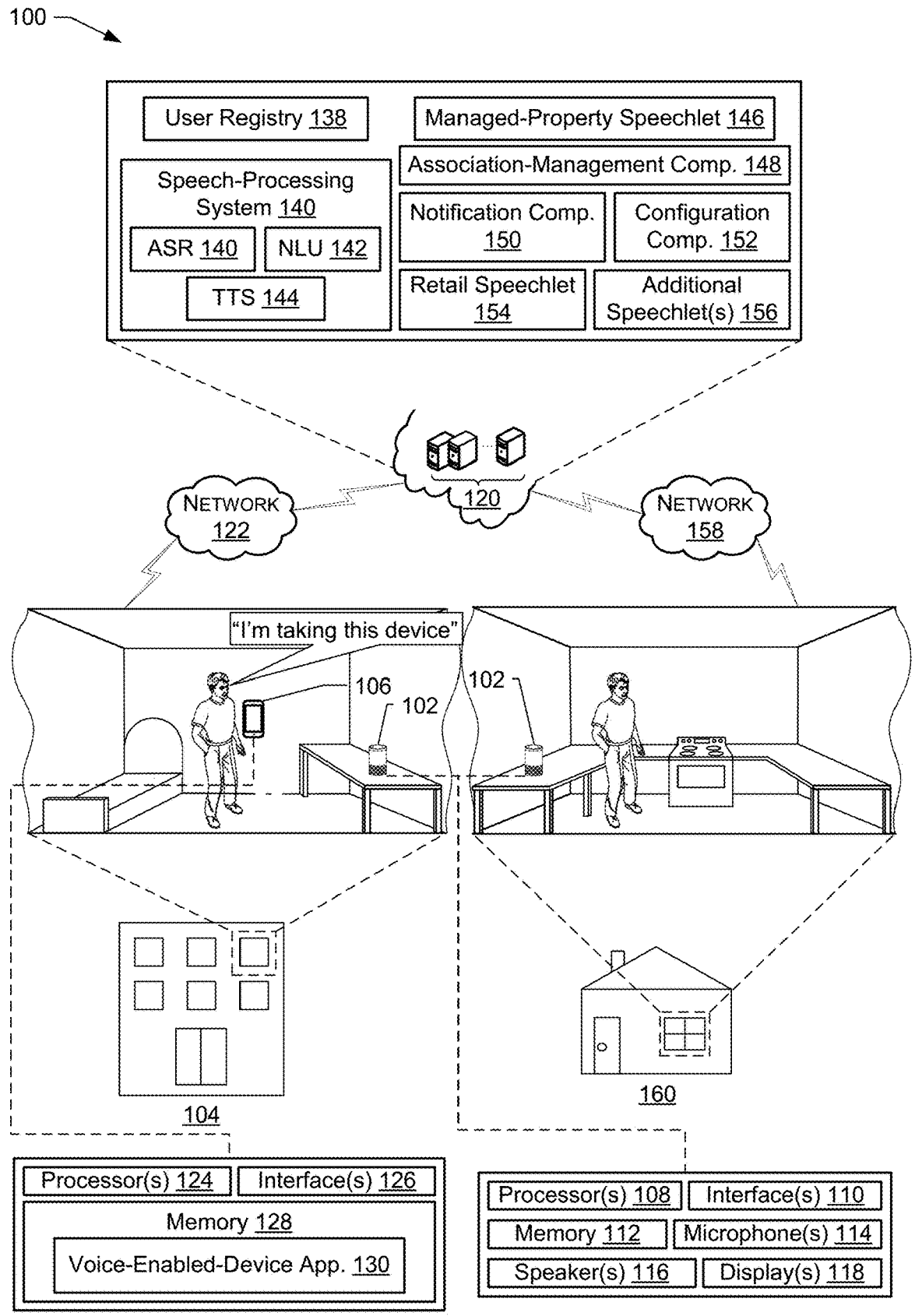
FIG. 1 illustrates a schematic diagram of an example environment for account association for voice-enabled devices.

Systems and methods for account association with voice-enabled devices are described herein. Take, for example, a hotel or other environment where users may reside temporarily. The hotel may include a number of rooms and/or suites, and some or all of these rooms may have situated therein one or more voice-enabled devices. The voice-enabled devices may be any devices that may capture audio, such as from a person speaking, generate corresponding audio data to be processed, and either perform an action associated with the audio and/or confirm that an action has been performed by another device and/or system. Such devices may include, for example, voice-assistant devices, televisions, door and/or window locks, light bulbs, clocks, alarms, phones, kitchen appliances, etc. The voice-enabled devices of the hotel may be associated with one or more user accounts associated with the hotel.

When a guest is present in a hotel room, the guest may desire to interact with the voice-enabled device, such as by saying "what's the weather like outside," "play Song A," "turn the lights off," "order a pizza," "purchase Product A," etc. In some examples, the user account of the hotel, which may be described as the default account, may not have access to and/or permission to utilize resources to perform the action. For example, the default user account may not have access to a music resource to output a requested song, or access to resources representing payment instruments to purchase a product or order a pizza. In these examples, a temporary association may be established between a personal user account and the voice-enabled device. Thereafter, the system may utilize resources available to the personal user account to perform actions.

In examples, the user, upon departing from the environment, may desire to take the voice-enabled device with them. For example, a user may not have voice-enabled devices at his/her home and may have liked his/her experience with the voice-enabled devices in the hotel. In these examples, the user may desire to take the voice-enabled device with him/her so that it may be utilized in the home. In other examples, a user may have voice-enabled devices in his/her home, but a newer version and/or a different type of voice-enabled device may be present in the hotel and the user may desire to take that new and/or different voice-enabled device with him/her. A user may be prompted with an option to take the voice-enabled device, such as by a pamphlet or other print media situated near the voice-enabled device within the environment, and/or by a prompt when the user checks out of the hotel, and/or by audio output by the speakers of the voice-enabled device, and/or by a prompt displayed in association with an application residing on and/or accessible to a personal device, such as a mobile phone, of the user.

When the user takes the voice-enabled device, a remote system associated with the voice-enabled device may receive an indication that the device has been removed from the environment. For example, when the voice-enabled device is unplugged, communications between the voice-enabled device and the remote system and/or a third-party system associated with the hotel may cease. The cessation of such communications may act as the indication that the device has been removed from the environment. Additionally, or alternatively, the third-party system, based at least in part on visual inspection of the environment by an employee, for example, may provide the indication. Additionally, or alternatively, the user may provide the indication via the voice-enabled device and/or the personal device. For example, the user may provide a user utterance of "I'm taking this device," or some other user utterance indicating an intent to remove the device from the environment. The remote system may process corresponding audio data to determine the intent to remove the device and may generate data indicating as much. By way of further example, the user may provide input to the application residing on and/or accessible to the personal device indicating the intent to remove the device, and the personal device may generate corresponding input data that may be sent to the remote system. Additionally, or alternatively, geolocation data may be utilized to indicate when the device is removed from the environment. For example, the environment may be associated with a geographic location and the device may be equipped with geolocation components that communicate the geolocation of the device to the remote system. In instances where the geolocation of the device differs from the location of the environment, such as by a threshold distance for example, the indication that the device has been removed may be generated. Additionally, or alternatively, a network change may indicate that the device has been removed. For example, a first network may be associated with the hotel and may be utilized to send data to and receive data from the voice-enabled device. When the device is removed, a user may set up and/or attempt to set up the device for use with a second network, such as a network associated with the home of the user. The remote system may receive data indicating that the voice-enabled device is associated with the second network and/or the user is attempting to set up the device on the second network, and this data may be utilized to generate the indication that the device has been removed from the environment.

Based at least in part on the remote system receiving the indication that the device has been removed, one or more actions may be performed. For example, the voice-enabled device may have been associated with a default account associated with the hotel. The default account may be dissociated from the device identifier corresponding to the voice-enabled device such that the default account may not be utilized when processing user utterances. Additionally, or alternatively, the device identifier may be dissociated from a speechlet, such as a managed-property speechlet, used to manage and/or process user utterances while the device was situated in the hotel. Additionally, or alternatively, during the user's stay at the hotel, the user may have temporarily associated a personal user account with the device identifier associated with the device. A component of the remote system may have stored data indicating this temporary association, otherwise described herein as an active account. Based at least in part on receiving the indication that the device has been removed, the data indicating the active account may be removed and/or transferred away from the component of the remote system. In this way, the voice-enabled device and its related device identifier may be dissociated from the hotel and/or its databases and/or speechlets.

Additionally, or alternatively, the device identifier for the voice-enabled device may be associated with a user account associated with the user. For example, in instances where the user account is temporarily associated with the device identifier during the user's stay at the hotel, the remote system may utilize this information to identify the user account, such as in a user registry of user accounts, and cause the device identifier to be associated with the user account. In these examples, data indicating the network associated with the user account and/or passwords and/or other access authorizations associated with the network may be stored in association with the user account. This data may be utilized to configure the device to communicate via the user's network, such as without requiring setup by the user. In instances where the user account was not temporarily associated with the device during the user's stay at the hotel, the remote system may query for identifying information to determine which user account to associate the device identifier with. For example, the remote system may request identifying information from the third-party system associated with the hotel. Additionally, or alternatively, the remote system may request identifying information from the user, such as via audible responses provided to the voice-enabled device and/or via input received by the personal device using the application.

Additionally, or alternatively, based at least in part on the remote system receiving the indication that the device has been removed, the user account may be utilized to charge and/or otherwise access payment for the voice-enabled device. For example, one or more payment instruments may be associated with the user account and may be utilized by the remote system to effectuate a transaction for the voice-enabled device. In examples, the transaction may be between an account associated with the remote system and the user account. In other examples, the transaction may be between the default account and the user account. In these and other examples, the remote system may receive pricing information from the third-party system associated with the hotel.

Additionally, or alternatively, based at least in part on the remote system receiving the indication that the device has been removed, a replacement voice-enabled device may be caused to be sent to a mailing address associated with the third-party system. For example, one or more repurchase settings may be utilized to determine if the third-party system has indicated that a replacement device should be sent when the voice-enabled device is removed from the environment. In other examples, the remote system may receive a request for a replacement device from the third-party system. The remote system may request a mailing address associated with the third-party system with which to send the replacement device and/or the remote system may identify and/or determine a device type of the voice-enabled device that was removed. The remote system may utilize this information to cause the replacement voice-enabled device to be sent to the mailing address. For example, an order may be generated to replace the device, and the order may be utilized by one or more systems and/or persons to effectuate sending the replacement device. In examples, information associated with the location of the voice-enabled device prior to being removed may be sent in addition to sending the replacement device. This information may be utilized to determine where the replacement device should be positioned within the environment.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for transferring accounts for voice-enabled devices. The system 100 may include, for example, one or more voice-enabled devices 102, which may be situated in one or more rooms and/or suites associated with a managed environment 104, such as, for example, a hotel, a wedding venue, a study room, a classroom, an automobile, and/or any other room or group of rooms that a person may reside in temporarily. The system 100 may additionally include a personal device 106, which may be a device associated with a user located within the managed environment 104. The personal device 106 may be, for example, a mobile phone, a personal-assistant device, a laptop computer, a tablet, a watch, and/or any other electronic device capable of sending and receiving information.

The voice-enabled device 102 may include components such as, for example, one or more processors 108, one or more network interfaces 110, memory 112, one or more microphones 114, one or more speakers 116, and/or one or more displays 118. The microphones 114 may be configured to capture audio, such as user utterances, and generate corresponding audio data. The speakers 116 may be configured to output audio, such as in response to receiving audio data and/or directive data from a remote system 120 via a first network 122. The displays 118 may be configured to visually present information to a user.

The personal device 106 may include components such as, for example, one or more processors 124, one or more network interfaces 126, and memory 128. The memory 128 of the personal device 106 may include one or more components, such as, for example, a voice-enabled-device application 130. The voice-enabled-device application 130 may be configured to cause display of information associated with use of the voice-enabled device 102 and/or to receive input from the user via the personal device 106 and generate corresponding input data.

The remote system 120 may be configured to receive and send data between the remote system 120, the voice-enabled device 102, and/or the personal device 106, for example. The remote system 120 may include components such as, for example, a user registry 138, a speech-processing system 139, which may include an automatic speech recognition (ASR) component 140, a natural language understanding (NLU) component 142, and/or a text-to-speech (TTS) component 144, a managed-property speechlet 146, an association-management component 148, a notification component 150, a configuration component 152, a retail speechlet 154, and/or one or more additional speechlets 156. Each of the components described herein with respect to the remote system 120 may be associated with their own systems, which collectively may be referred to herein as the remote system 120, and/or some or all of the components may be associated with a single system. In examples, some or each of the components of the remote system 120 may include their own processor(s), network interface(s), and/or memory. As such, by way of example, the speech-processing system 139 may include and/or be associated with processor(s), network interface(s), and/or memory. The managed-property speechlet 146 and/or the association-management component 148 may include and/or be associated with different processor(s), network interface(s), and/or memory, or one or more of these components may utilize some or all of the same processor(s), network interface(s), and/or memory utilized by the speech-processing system 139. These components are described in detail below. Additionally, the operations and/or functionalities associated with and/or described with respect to the components of the remote system 120 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

The user registry component 138 may be configured to identify, determine, and/or generate associations between users, user profiles, user accounts, and/or devices. For example, one or more associations between user profiles and user accounts may be identified, determined, and/or generated by the user registry 138. The user registry 138 may additionally store information indicating one or more applications and/or resources accessible to and/or enabled for a given user profile and/or user account. It should also be understood that a user account may be associated with one or more than one user profiles. It should also be understood that the terms "user account" and/or "user profile" may be used to describe a set of data and/or functionalities associated with a given account identifier and/or profile identifier. For example, data identified, determined, and/or generated while using some or all of the system 100 may be stored or otherwise associated with an account identifier and/or profile identifier. Data associated with the user accounts and/or profiles may include, for example, account/profile access information, historical usage data, device-association data, and/or preference data. Additionally, as described herein, the resources and/or domain speechlets may include one or more applications, skills, abilities, functionalities, and/or capabilities of the remote system 120 and/or one or more other devices and/or systems that have been authorized and/or are otherwise available to be used when audio data representing a user utterance is received that is associated with the given account identifier and/or profile identifier. Some nonlimiting examples of resources may include functionalities associated with playing music, accessing playlists and/or audio file databases, shopping, controlling accessory devices such as a light bulbs and/or locks, accessing contact information associated with contacts, and/or sending and/or receiving messages.

The speech-processing system 139 may be configured to receive audio data, which may represent human speech such as user utterances, and the ASR component 140 of the speech-processing system 139 may generate text data corresponding to the audio data. The text data may include words corresponding to the human speech. The NLU component 142 of the speech-processing system 139 may be configured to determine one or more intents associated with the human speech based at least in part on the text data. The ASR component 140 and the NLU component 142 are described in more detail below with respect to FIG. 9. For purposes of illustration, the ASR component 140 and the NLU component 142 may be utilized to determine one or more intents to perform an action that utilizes one or more of the resources and/or an intent to temporarily associate a user account with a voice-enabled device 102 and/or an intent to take the voice-enabled device 102 from the managed environment 104.

For example, a user may speak a user utterance to the voice-enabled device 102. The microphones 114 of the voice-enabled device 102 may capture the user utterance and may generate corresponding audio data. The audio data may be sent, via the network 122, to the speech-processing system 139. The ASR component 140 may process the audio data and generate corresponding text data. The NLU component 142 may utilize the text data to determine intent data representing an intent of the user to, in these examples, perform an action that utilizes one or more of the resources and/or an intent to temporarily associate a user account with a voice-enabled device 102 and/or an intent to take the voice-enabled device 102 from the managed environment 104. For example, the user utterance may be "I'm taking this device." The speech-processing system 139, utilizing the NLU component 142, may identify an intent for removing the device from the managed environment 104. Data indicating this intent may be utilized for determining that the voice-enabled device 102 has been removed from the managed environment 104. The TTS component 144 may be utilized to generate audio data to be utilized by the voice-enabled device 102 to output audio. For example, the output audio may be "thank you for purchasing this device." The example audio provided above is provided by way of illustration only and not as a limitation.

The managed-property speechlet 146 may be configured to receive intent data from the NLU component 142, such as when the device identifier associated with the voice-enabled device 102 is associated with the default account associated with the third-party system. The managed-property speechlet 146 may utilize the intent data to identify, determine, and/or generate directive data corresponding to the intent data. For example, the managed-property speechlet 146 may be called and utilized to generate directive data that, when sent to and utilized by the voice-enabled device 102, causes output of audio, such as via the speakers 116. The managed-property speechlet 146 may enable one or more resources associated with the managed property, such as, for example, the ability to order room service, call the front desk, request additional pillows and/or blankets, order movies, operate accessory device such as clocks, televisions, and locks associated with the managed property, etc.

The association-management component 148 may be configured to identify and/or determine the association between the default account, the user account, and the voice-enabled device 102. For example, in instances where the voice-enabled device 102 is temporarily associated with a user account, such as for a limited time while the user is temporarily residing in the managed space, the association-management component 148 may be utilized to determine that the user account is actively associated with the device identifier associated with the voice-enabled device 102. This information may be utilized to determine how to process audio data and/or which resources may be utilized to perform one or more actions associated with the audio data. The association-management component 148 may additionally, or alternatively, be configured to store data associated with the period of time that the account is to be associated with the voice-enabled device 102.

The association-management component 148 may be further configured to receive an indication that the voice-enabled device 102 has been removed from the managed environment 104. For example, when the voice-enabled device 102 is unplugged, communications between the voice-enabled device 102 and the remote system 120 and/or a third-party system associated with the managed environment 104 may cease. The cessation of such communications may act as the indication that the device 102 has been removed from the managed environment 104. Additionally, or alternatively, the third-party system, based at least in part on visual inspection of the managed environment 104 by an employee, for example, may provide the indication. Additionally, or alternatively, the user may provide the indication via the voice-enabled device 102 and/or the personal device 106. For example, the user may provide a user utterance of "I'm taking this device," or some other user utterance indicating an intent to remove the device 102 from the environment 104. The remote system 120 may process corresponding audio data to determine the intent to remove the device 102 and may generate data indicating as much. For example, intent data representing a "taking device" or similar intent may be generated by the NLU component 142 and may be utilized by the remote system 120, such as, for example, via the managed-property speechlet 146 and/or the association-management component 148 to perform one or more actions.

By way of further example, the user may provide input to the voice-enabled-device application 130 residing on and/or accessible to the personal device 106 indicating the intent to remove the voice-enabled device 102, and the personal device 106 may generate corresponding input data that may be sent to the remote system 120. Additionally, or alternatively, geolocation data may be utilized to indicate when the voice-enabled device 102 is removed from the managed environment 104. For example, the managed environment 104 may be associated with a geographic location and the voice-enabled device 102 may be equipped with geolocation components that communicate the geolocation of the device 102 to the remote system 120. In instances where the geolocation of the voice-enabled device 102 differs from the location of the managed environment 104, such as by a threshold distance for example, the indication that the device 102 has been removed may be generated. Additionally, or alternatively, a network change may indicate that the voice-enabled device 102 has been removed. For example, the network 122 may represent a first network 122 and may be associated with the managed environment 104 and may be utilized to send data to and receive data from the voice-enabled device 102. When the device 102 is removed, a user may set up and/or attempt to set up the device 102 for use with a second network 158, such as a network 158 associated with the home of the user. The remote system 120 may receive data indicating that the voice-enabled device 102 is associated with the second network 158 and/or the user is attempting to set up the device 102 on the second network 158, and this data may be utilized to generate the indication that the device 102 has been removed from the managed environment 104.

Several of the examples of environments utilized herein have been described as managed properties. In other examples, the environments may be, for example, places of work such as offices and/or office buildings. In these examples, the device 102 may be taken back and forth from the office to another environment such as a home of a user of the device 102. In these examples, the remote system 120 may be configured to determine when the device 102 is situated in the office environment and when the device 102 is situated in the home environment. While situated in the office environment, the device 102 may be associated with the user account as well as a separate account, here described as a work account, which may be associated with a system associated with the office environment. For example, scheduling functionality may be associated with the work account that may allow of scheduling between user profiles associated with the office environment. In these examples, when the device 102 is removed from the office environment, the work account may be dissociated from the device 102, such as until it is determined that the device 102 has been returned to the office environment.

Based at least in part on the remote system 120 receiving the indication that the voice-enabled device 102 has been removed, one or more actions may be performed. For example, the voice-enabled device 102 may have been associated with a default account associated with the managed environment 104. The association-management component 148 may be configured to dissociate the default account from the device identifier corresponding to the voice-enabled device 102 such that the default account may not be utilized when processing user utterances. Additionally, or alternatively, the device identifier may be dissociated from the managed-property speechlet 146. Additionally, or alternatively, in instances where the user account is temporarily associated with the device identifier associated with the device 102, the association-management component 148 may remove and/or transfer data indicating the active account. In this way, the voice-enabled device 102 and its related device identifier may be dissociated from the managed environment 104 and/or its components 148 and/or speechlets 146.

Additionally, or alternatively, the device identifier for the voice-enabled device 102 may be associated with a user account associated with the user. For example, in instances where the user temporarily associated the user account with the device identifier during the user's stay at the managed environment 104, the remote system 120 may utilize this information to identify the user account, such as in the user registry 138, and cause the device identifier to be associated with the user account. In these examples, data indicating the network 158 associated with the user account and/or passwords and/or other access authorizations associated with the network 158 may be stored in association with the user account.

The notification component 150 may be configured to generate notification data representing notifications associated with the processes described herein. For example, the notifications may include alerts that the voice-enabled device 102 has been removed from the managed environment 104, information associated with the user account that was temporarily associated with the voice-enabled device 102, alerts associated with transactions between the default account and the user account, and/or alerts associated with the ordering and/or sending of replacement devices. By way of further example, the notifications may request information from the third-party system associated with the managed environment 104 and/or from the voice-enabled device 102 and/or the personal device 106. For example, the notifications may request the third-party system to confirm that the voice-enabled device 102 has been removed from the managed environment 104, and/or pricing data representing a price charged by the third-party system for the voice-enabled device 102 when taken, and/or mailing data representing a mailing address to send replacement devices to. The notifications may also request confirmation from the user that the user has taken the voice-enabled device 102. For example, the notifications may include audio data that may be utilized to output audio via the speakers 116 of the voice-enabled device 102 and/or text data that may be utilized to display text via the display 118 of the voice-enabled device 102. These notifications may request user input confirming that the voice-enabled device 102 has been taken.

The configuration component 152 may be configured to utilize data associated with the user account stored, for example, in the user registry 138 to configure the device to communicate via the user's network 158, such as without requiring setup by the user. In instances where the user account was not temporarily associated with the voice-enabled device 102 during the user's stay at the managed environment 104, the remote system 120 may query for identifying information to determine which user account to associate the device identifier with. For example, the remote system 120 may request identifying information from the third-party system associated with the managed environment 104. Additionally, or alternatively, the remote system 120 may request identifying information from the user, such as via audible responses provided to the voice-enabled device 102 and/or via input received by the personal device 106 using the voice-enabled-device application 130.

For example, the configuration component 152 may identify and/or determine that the user account is associated with a voice-enabled-device account and/or profile. The user may have previously setup a voice-enabled device, and in doing so, may have established a user profile and/or user account associated with that voice-enabled device. The user profile and/or user account may include data indicating the make and/or model of the voice-enabled device, the network 158 associated with a personal environment 160 of the user, and/or device-configuration settings associated with the voice-enabled device, such as, for example, a naming indicator associated with the network 158 and/or access authorization credentials such as passwords associated with the network 158. When the voice-enabled device 102 is activated in the personal environment 160, such as by plugging in the device 102 and/or initiating setup of the device 102, a naming indicator associated with the network the device 102 is operating from may be identified by the configuration component 152. In examples, the naming indicator may be the same as or similar to the naming indicator associated with the user account. In these examples, the configuration component 152 may cause the voice-enabled device 102 to be configured to send and receive data using the network 158 given that the same network associated with the user account is being used to setup and/or initiate the device in the personal environment 160.

In examples where the naming indicator is not the same as or similar to the naming indicator associated with the user account, and/or if a voice-enabled-device profile and/or account has not been previously setup, data representing a request to setup a voice-enabled-device profile and/or account may be sent to the voice-enabled device 102 and/or the personal device 106. For example, audio data and/or text data may be sent representing the request for input associated with device-configuration settings, such as network naming indicators, access authorizations, account names and/or access information, etc. The configuration component 152 may receive input data corresponding to a response including the device-configuration settings. The configuration component 152 may utilize the device-configuration settings to cause the voice-enabled device 102 to be configured for use with the personal environment 160 and/or the network 158.

The retail speechlet 154 may be configured to charge and/or otherwise access payment for the voice-enabled device 102. For example, one or more payment instruments may be associated with the user account and may be utilized by the retail speechlet 154 to effectuate a transaction for the voice-enabled device 102. In some examples, the transaction may be between an account associated with the remote system 120 and the user account. In other examples, the transaction may be between the default account and the user account. In these and other examples, the remote system 120 may receive pricing information from the third-party system associated with the managed environment 104. By way of example, notification data may be sent to the third-party system associated with the default account that indicates the voice-enabled device 102 has been dissociated from the default account. The notification may request pricing data indicating a price for the voice-enabled device 102. The retail speechlet 154 may receive the pricing data and identify a payment instrument associated with the user account. The retail speechlet 154 may utilize the payment instrument to cause a payment transaction to occur between the default account and the user account and/or an account associated with the remote system 120 and the user account. In examples, instead of taking the voice-enabled device 102 located in the room the user is in, the user may express a desire, such as through interaction with the voice-enabled device 102 and/or the third-party system to take a new voice-enabled device 102. In these examples, a new voice-enabled device may be provided to the user upon checking out from the environment. In these and other examples, the retail speechlet 154 may cause presentation of one or more options, such as on the personal device 108 and/or the voice-enabled device 102, to allow a user to dispute the charging of their account for the voice-enabled device 102 and/or to confirm charging before it occurs.

Additionally, or alternatively, the retail speechlet 154 and/or one or more other components of the remote system 120 may be configured to cause a replacement voice-enabled device to be sent to a mailing address associated with the third-party system. For example, one or more repurchase settings associated with the third-party system may be utilized to determine if the third-party system has indicated that a replacement device should be sent when the voice-enabled device 102 is removed from the managed environment 104. In other examples, the remote system 120 may receive a request for a replacement device from the third-party system. The remote system 120 may request a mailing address associated with the third-party system with which to send the replacement device and/or the remote system 120 may identify and/or determine a device type of the voice-enabled device 102 that was removed. The remote system 120 may utilize this information to cause the replacement voice-enabled device to be sent to the mailing address. For example, an order may be generated to replace the device, and the order may be utilized by one or more systems and/or persons to effectuate sending the replacement device. In examples, information associated with the location of the voice-enabled device 102 prior to being removed may be sent in addition to sending the replacement device. This information may be utilized to determine where the replacement device should be positioned within the managed environment 104.

One or more additional speechlets 156 may be utilized by the remote system 120 and/or may be enabled and/or disabled for use given the processes described herein. For example, the device identifier may be a permitted device identifier for one or more of the speechlets 156 when the device identifier is associated with the default account and is disposed in the managed environment 104. However, at least a portion of the speechlets 156 may be disabled for use with the voice-enabled device 102 when removed from the managed environment 104. Additionally, or alternatively, speechlets 156 may be enabled for use when the device identifier of the voice-enabled device 102 is associated with the user account.

The speechlets 146, 154, and/or 156 described herein may include a speech-enabled web component that may run in the remote system 120. Speechlets 146, 154, and/or 156 may receive and respond to speech-initiated requests. Speechlets 146, 154, and/or 156 may define life-cycle events for a skill as experienced by a user, a way to process speech requests from the user, and/or call-backs from events happening on the device the user is interacting with. Given speechlets may be capable of handling certain intents. For example, the NLU component 142 may generate intent data that indicates an intent as well as a payload associated with the intent. A speechlet may be associated with the intent, and thus the intent data, including the payload may be sent to and received by the speechlet. The speechlet may process that intent by analyzing the payload and generating data representing a directive and/or instruction to perform an action. The directive and/or instruction may be sent to other components of the system for performance of the action.

As used herein, a processor, such as processor(s) 108, 124, and/or the processor(s) described with respect to the components of the remote system 120, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 108, 124, and/or the processor(s) described with respect to the components of the remote system 120 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108, 124, and/or the processor(s) described with respect to the components of the remote system 120 may possess its own local memory, which also may store program components, program data, and/or one or more operating systems.

The memory 112, 128, and/or the memory described with respect to the components of the remote system 120 may include volatile and nonvolatile memory, removable and non-removable media implemented in any method or technology for storage of information, such as computer-readable instructions, data structures, program component, or other data. Such memory 112, 128, and/or the memory described with respect to the components of the remote system 120 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 112, 128, and/or the memory described with respect to the components of the remote system 120 may be implemented as computer-readable storage media ("CRSM"), which may be any available physical media accessible by the processor(s) 108, 124, and/or the processor(s) described with respect to the components of the remote system 120 to execute instructions stored on the memory 112, 128, and/or the memory described with respect to the components of the remote system 120. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 112, 128, and/or the memory described with respect to the components of the remote system 120, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project: other UNIX or UNIX-like variants; a variation of the Linux operating system as promulgated by Linus Torvalds: the FireOS operating system from Amazon.com Inc. of Seattle, Washington, USA: the Windows operating system from Microsoft Corporation of Redmond, Washington, USA: LynxOS as promulgated by Lynx Software Technologies, Inc. of San Jose, California: Operating System Embedded (Enea OSE) as promulgated by ENEA AB of Sweden; and so forth.

The network interface(s) 110, 126, and/or the network interface(s) associated with the components of the remote system 120 may enable messages between the components and/or devices shown in system 100 and/or with one or more other remote systems, as well as other networked devices. Such network interface(s) 110, 126, and/or the network interface(s) associated with the components of the remote system 120 may include one or more network interface controllers (NICs) or other types of transceiver devices to send and receive messages over the network(s) 122 and/or 158.

For instance, each of the network interface(s) 110, 126, and/or the network interface(s) associated with the components of the remote system 120 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 110, 126, and/or the network interface (s) associated with the components of the remote system 120 may include a wide area network (WAN) component to enable message over a wide area network.

In some instances, the remote system 120 may be local to an environment associated the voice-enabled device 102. For instance, the remote system 120 may be located within the voice-enabled device 102. In some instances, some or all of the functionality of the remote system 120 may be performed by the voice-enabled device 102.

Figure 2:
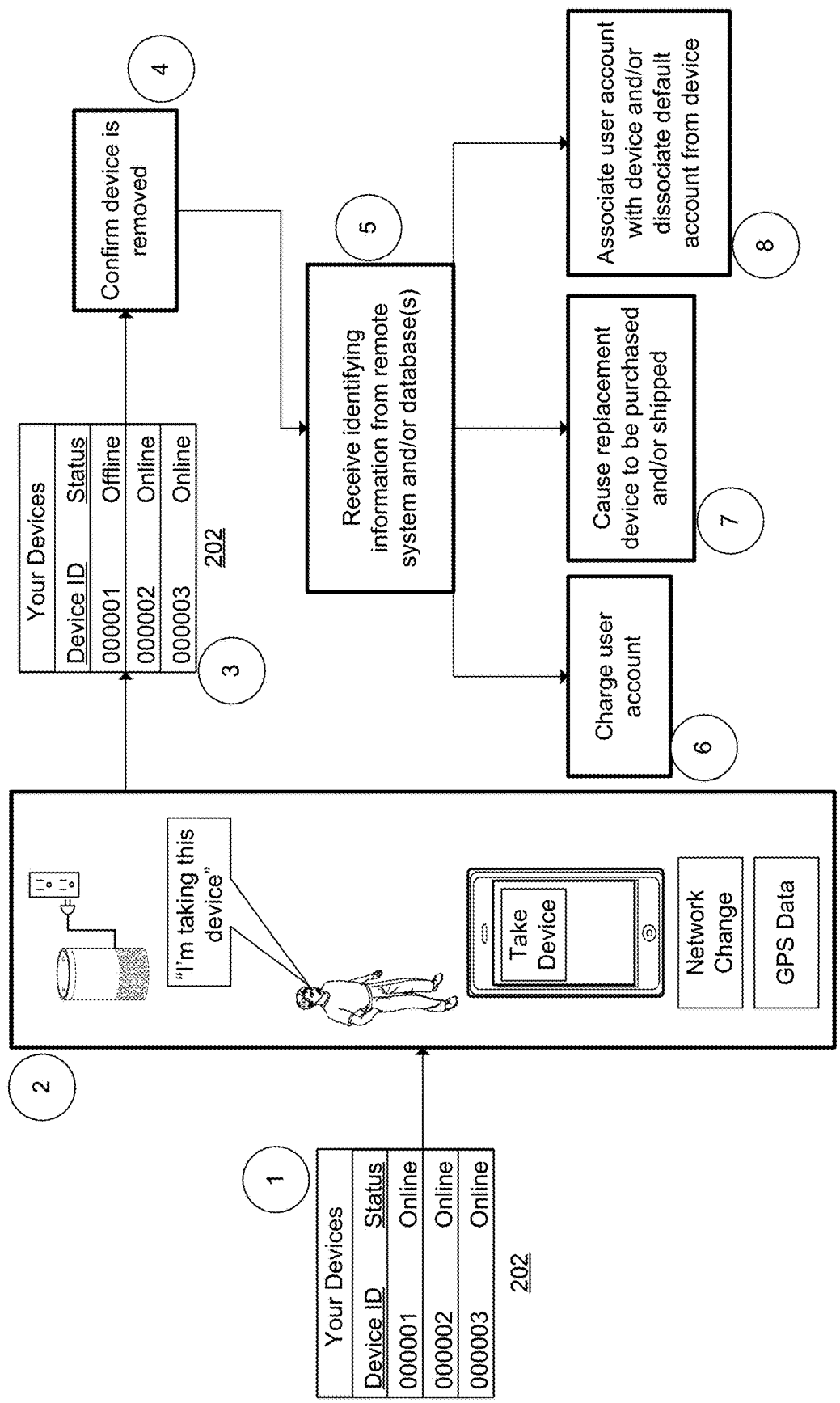
FIG. 2 illustrates a conceptual diagram of an example process for account association with voice-enabled devices.

FIG. 2 illustrates a conceptual diagram of an example process 200 for account association with voice-enabled devices. FIG. 2 will be described below as a collection of steps and/or operations 1-8. At least a portion of the processes described with respect to FIG. 2 are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1, 9, and 10, although the processes may be implemented in a wide variety of other environments, architectures and systems.

At step 1, a user interface 202 may be generated and caused to be displayed on a display associated with a third-party system. The user interface 202 may display information such as device identifiers associated with voice-enabled devices associated with the third-party system. As shown in FIG. 2, the depicted third-party system includes three devices with device identifiers of "000001," "000002," and "000003." The user interface 202 may also display information such as device status of the voice-enabled devices. For example, the user interface 202 may indicate whether the voice-enabled devices are "online" or "offline." Additional information that may be displayed via the user interface 202 may include a "friendly" name associated with the voice-enabled devices, such as "Room 202," "Presidential Suite," etc., a device type of the voice-enabled devices, modalities associated with the voice-enabled devices, naming indicators for the portion of the managed environment that the device is situated in, and/or network indicators and/or media access control (MAC) address indicators associated with the voice-enabled devices, for example. It should be understood that the example information presented using the user interface 202 is provided by way of illustration and not as a limitation. Other information may be displayed. As shown with respect to step 1, each of the three example voice-enabled devices show a status of "online," which may indicate that the voice-enabled devices are plugged in and are in communication with the network and/or the remote system.

At step 2, a triggering event may occur that indicates a given voice-enabled device has been removed from the managed environment. For example, when the voice-enabled device is unplugged, communications between the voice-enabled device and the remote system and/or a third-party system associated with the hotel may cease. The cessation of such communications may act as the indication that the device has been removed from the environment. Additionally, or alternatively, the third-party system, based at least in part on visual inspection of the environment by an employee, for example, may provide the indication. Additionally, or alternatively, the user may provide the indication via the voice-enabled device and/or the personal device. For example, the user may provide a user utterance of "I'm taking this device," or some other user utterance indicating an intent to remove the device from the environment. The remote system may process corresponding audio data to determine the intent to remove the device and may generate data indicating as much. By way of further example, the user may provide input to the application residing on and/or accessible to the personal device indicating the intent to remove the device, and the personal device may generate corresponding input data that may be sent to the remote system. Additionally, or alternatively, geolocation and/or global positioning system (GPS) data may be utilized to indicate when the device is removed from the environment. For example, the environment may be associated with a geographic location and the device may be equipped with geolocation components that communicate the geolocation of the device to the remote system. In instances where the geolocation of the device differs from the location of the environment, such as by a threshold distance for example, the indication that the device has been removed may be generated. Additionally, or alternatively, a network change may indicate that the device has been removed. For example, a first network may be associated with the hotel and may be utilized to send data to and receive data from the voice-enabled device. When the device is removed, a user may set up and/or attempt to set up the device for use with a second network, such as a network associated with the home of the user. The remote system may receive data indicating that the voice-enabled device is associated with the second network and/or the user is attempting to set up the device on the second network, and this data may be utilized to generate the indication that the device has been removed from the environment.

At step 3, the user interface 202 may display an indication that the voice-enabled device has been removed from the managed environment. For example, the device status may be displayed as "offline." An alert and/or notification may be transmitted to the third-party system alerting an operator of the system that a device status has changed. As shown, for example, at step 3, the voice-enabled device having a device identifier of "000001" has a device status of "offline," indicating that the device has been unplugged and/or that the device is not in communication with the network and/or the remote system.

At step 4, the remote system may confirm that the voice-enabled device has been removed from the managed environment. For example, the remote system may request confirmation from the third-party system that the device has been removed and may receive data representing the confirmation. Additionally, or alternatively, the remote system may receive an indication that the voice-enabled device has been connected to a network other than the network associated with the managed environment, which may indicate confirmation that the device has been removed. Additionally, or alternatively, the remote system may request confirmation form a personal device associated with the user and/or from the voice-enabled device that the device has been removed and may receive data representing the confirmation. Additionally, or alternatively, the remote system may receive geolocation data associated with the device and determine that the geolocation of the device is outside an area associated with the third-party system.

At step 5, the remote system may receive identifying information associated with a user account of the user that took the device and/or that has been provided the device. For example, in instances where the user temporarily associated a user account with the voice-enabled device during a stay at the managed environment, an association-management component storing and/or having access to information associated with the user account may be queried to provide the identifying information. In instances where the user did not associate a user account with the voice-enabled device during a stay at the managed environment, the remote system may request identifying information from the third-party system. For example, the managed environment may have acquired identifying information during the check-in process for the user to temporarily stay at the managed environment. The third-party system may provide that information to the remote system for purposes of identifying the user. This information may only be shared with the third-party system with authorization from the user, such as given to the third-party system.

At step 6, the remote system may cause the user account to be charged for the price of the voice-enabled device. For example, a retail speechlet of the remote system may be configured to charge and/or otherwise access payment for the voice-enabled device. For example, one or more payment instruments may be associated with the user account and may be utilized by the retail speechlet to effectuate a transaction for the voice-enabled device. In some examples, the transaction may be between an account associated with the remote system and the user account. In other examples, the transaction may be between the default account and the user account. In these and other examples, the remote system may receive pricing information from the third-party system associated with the managed environment. By way of example, notification data may be sent to the third-party system associated with the default account that indicates the voice-enabled device has been dissociated from the default account. The notification may request pricing data indicating a price for the voice-enabled device. The retail speechlet may receive the pricing data and identify a payment instrument associated with the user account. The retail speechlet may utilize the payment instrument to cause a payment transaction to occur between the default account and the user account and/or an account associated with the remote system and the user account.

At step 7, the remote system may cause a replacement device to be purchased and/or shipped to an address associated with the third-party system. For example, the retail speechlet and/or one or more other components of the remote system may be configured to cause a replacement voice-enabled device to be sent to a mailing address associated with the third-party system. For example, one or more repurchase settings associated with the third-party system may be utilized to determine if the third-party system has indicated that a replacement device should be sent when the voice-enabled device is removed from the managed environment. In other examples, the remote system may receive a request for a replacement device from the third-party system. The remote system may request a mailing address associated with the third-party system with which to send the replacement device and/or the remote system may identify and/or determine a device type of the voice-enabled device that was removed. The remote system may utilize this information to cause the replacement voice-enabled device to be sent to the mailing address. For example, an order may be generated to replace the device, and the order may be utilized by one or more systems and/or persons to effectuate sending the replacement device. In examples, information associated with the location of the voice-enabled device prior to being removed may be sent in addition to sending the replacement device. This information may be utilized to determine where the replacement device should be positioned within the managed environment.

At step 8, the remote system may associate the user account with the voice-enabled device and/or a device identifier associated with the voice-enabled device and/or dissociate the default account from the device identifier. For example, the voice-enabled device may have been associated with a default account associated with the managed environment. An association-management component of the remote system may be configured to dissociate the default account from the device identifier corresponding to the voice-enabled device such that the default account may not be utilized when processing user utterances. Additionally, or alternatively, the device identifier may be dissociated from a managed-property speechlet of the remote system and, in instances where the user account is temporarily associated with the device identifier associated with the device, the association-management component may remove and/or transfer data indicating the active account. In this way, the voice-enabled device and its related device identifier may be dissociated from the managed environment and/or its components and/or speechlets.

Additionally, or alternatively, the device identifier for the voice-enabled device may be associated with a user account associated with the user. For example, in instances where the user temporarily associated the user account with the device identifier during the user's stay at the managed environment, the remote system may utilize this information to identify the user account, such as in a user registry, and cause the device identifier to be associated with the user account. In these examples, data indicating the network associated with the user account and/or passwords and/or other access authorizations associated with the network may be stored in association with the user account. A configuration component of the remote system may be configured to utilize data associated with the user account stored, for example, in the user registry to configure the device to communicate via the user's network, such as without requiring setup by the user.

FIGS. 3-8 illustrate various processes for account association with voice-enabled devices. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1, 2, 9, and 10, although the processes may be implemented in a wide variety of other environments, architectures and systems.

Figure 3:
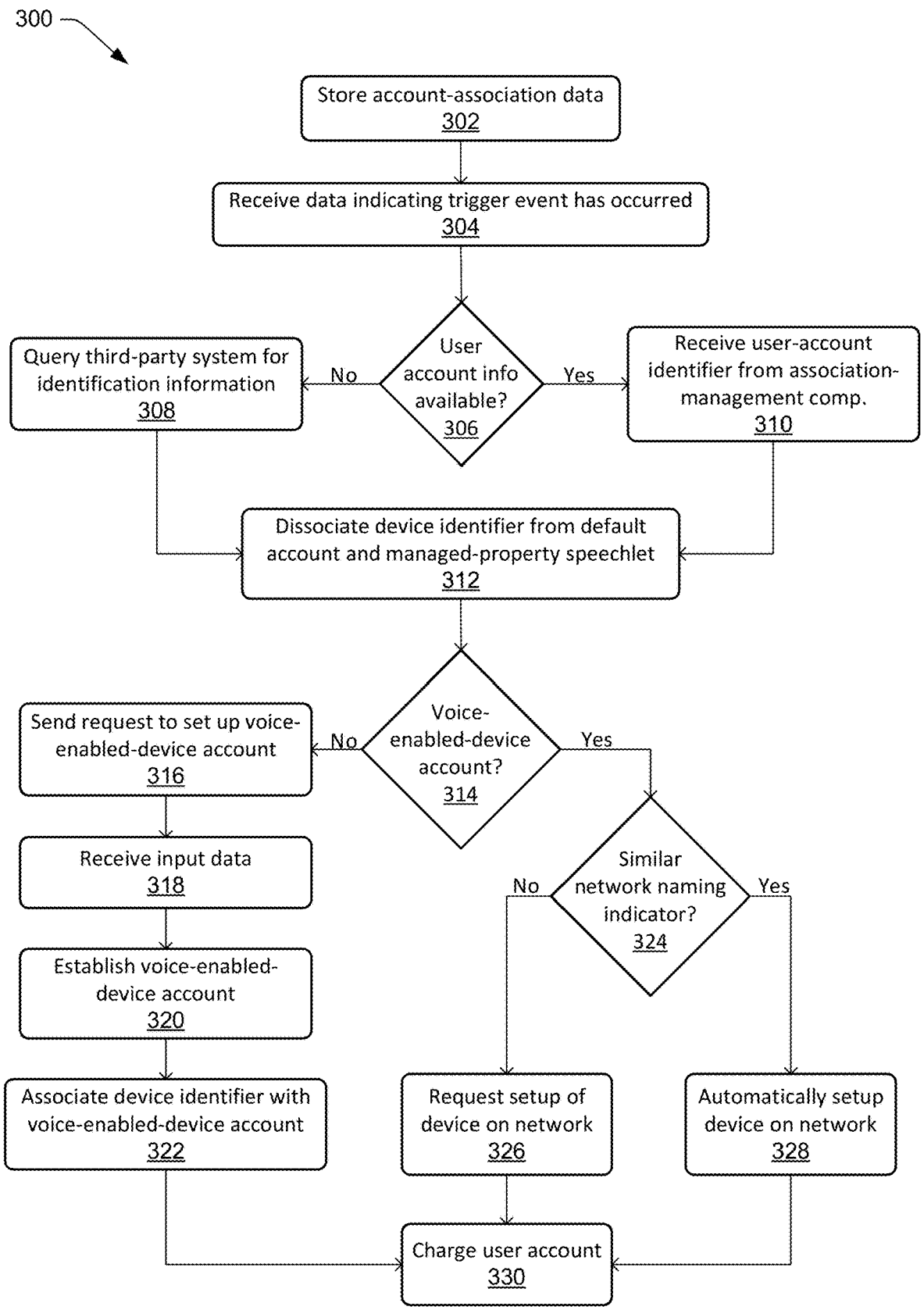
FIG. 3 illustrates a flow diagram of an example process for account association with voice-enabled devices and charging accounts.

FIG. 3 illustrates a flow diagram of an example process 300 for account association with voice-enabled devices and charging accounts. The order in which the operations or steps are described is not intended to be construed as a limitation, and any number of the described operations may be combined in any order and/or in parallel to implement process 300.

At block 302, the process 300 may include storing account-association data. For example, account-association data may be stored with respect to an association-management component of a remote system associated with a voice-enabled device. The association-management component may identify a default account associated with a third-party system and/or a managed environment in which the voice-enabled device is situated. The association-management component may further identify an "active account" associated with the voice-enabled device. The active account may correspond to a temporary association of the voice-enabled device with a user account of a user temporarily residing in the managed environment.

At block 304, the process 300 may include receiving data indicating that a trigger event has occurred. For example, a triggering event may occur that indicates a given voice-enabled device has been removed from the managed environment. For example, when the voice-enabled device is unplugged, communications between the voice-enabled device and the remote system and/or a third-party system associated with the hotel may cease. The cessation of such communications may act as the indication that the device has been removed from the environment. Additionally, or alternatively, the third-party system, based at least in part on visual inspection of the environment by an employee, for example, may provide the indication.

Additionally, or alternatively, the user may provide the indication via the voice-enabled device and/or the personal device. For example, the user may provide a user utterance of "I'm taking this device," or some other user utterance indicating an intent to remove the device from the environment. The remote system may process corresponding audio data to determine the intent to remove the device and may generate data indicating as much. By way of further example, the user may provide input to the application residing on and/or accessible to the personal device indicating the intent to remove the device, and the personal device may generate corresponding input data that may be sent to the remote system. Additionally, or alternatively, geolocation and/or global positioning system (GPS) data may be utilized to indicate when the device is removed from the environment. For example, the environment may be associated with a geographic location and the device may be equipped with geolocation components that communicate the geolocation of the device to the remote system. In instances where the geolocation of the device differs from the location of the environment, such as by a threshold distance for example, the indication that the device has been removed may be generated. Additionally, or alternatively, a network change may indicate that the device has been removed. For example, a first network may be associated with the hotel and may be utilized to send data to and receive data from the voice-enabled device. When the device is removed, a user may set up and/or attempt to set up the device for use with a second network, such as a network associated with the home of the user. The remote system may receive data indicating that the voice-enabled device is associated with the second network and/or the user is attempting to set up the device on the second network, and this data may be utilized to generate the indication that the device has been removed from the environment.

At block 306, the process 300 may include determining whether user account information is available. For example, in instances where the voice-enabled device was temporarily associated with a user account of a user temporarily residing in the managed environment, the remote system may determine that user account information is available. If, to the contrary, only the default account is associated with the voice-enabled device, then user account information may not be available.

At block 308, if user account information is unavailable, the remote system may query a third-party system associated with the voice-enabled device for identification information. For example, the third-party system may have acquired identifying information during the check-in process for the user to temporarily stay at the managed environment. The third-party system may provide that information to the remote system for purposes of identifying the user. This information may only be shared with the third-party system with authorization from the user, such as given to the third-party system. Additional safeguards may be implemented to ensure that any information associated with the user and/or user accounts is transmitted to and/or from the remote system in a transparent and authorized manner. These safeguards may include receive express permissions from users to transmit data, confirming permissions provided to third-party systems, sending alerts to user devices indicating when information has been shared, with whom, and/or what information was provided, providing users the ability to request that information be returned to the user and/or user account, etc. Additionally, the remote system may be configured to send such information in encrypted formats and/or to redact or otherwise refrain from sending information not useful for the processes described herein.

At block 310, if user account information is available, the remote system may receive a user-account identifier from an association-management component, for example, and/or another database indicating active accounts associated with voice-enabled devices. The user account may be an active account that is temporarily associated with the voice-enabled device.

At block 312, the process 300 may include dissociating a device identifier associated with the voice-enabled device from a default account associated with the third-party system and dissociating the device identifier from a managed-property speechlet of the remote system. For example, the voice-enabled device may have been associated with a default account associated with the managed environment. The association-management component of the remote system may be configured to dissociate the default account from the device identifier corresponding to the voice-enabled device such that the default account may not be utilized when processing user utterances. Additionally, or alternatively, the device identifier may be dissociated from a managed-property speechlet of the remote system and, in instances where the user account is temporarily associated with the device identifier associated with the device, the association-management component may remove and/or transfer data indicating the active account. In this way, the voice-enabled device and its related device identifier may be dissociated from the managed environment and/or its components and/or speechlets.

At block 314, the process 300 may include determining whether a voice-enabled-device account has been generated with respect to the user account. For example, the user may have previously setup a voice-enabled device, and in doing so, may have established a user profile and/or user account associated with that voice-enabled device. The user profile and/or user account may include data indicating the make and/or model of the voice-enabled device, the network associated with a personal environment of the user, and/or device-configuration settings associated with the voice-enabled device, such as, for example, a naming indicator associated with the network and/or access authorization credentials such as passwords associated with the network. In these instances, a voice-enabled-device account may have been generated. In instances where setup of a voice-enabled device has not yet occurred, a voice-enabled-device account may not have been generated.

If a voice-enabled-device account has not been generated at block 314, the process 300 may continue to block 316 where the remote system may send a request to set up the voice-enabled-device account. The request may comprise and/or include, for example, audio data for output of audio via speakers of the voice-enabled device and/or text data for presentation of text via a display of the voice-enabled device and/or a personal device of the user.

At block 318, the process 300 may include receiving input data representing a response to the request to set up the voice-enabled-device account. For example, the user may provide a user utterance and/or a tactile input in response to the request that includes information for establishing the voice-enabled-device account, account name, authorization access information, account preferences, a network naming indicator, and/or network authorization access credentials. Input data corresponding to the input may be generated and sent to the remote system.

At block 320, the process 300 may include establishing the voice-enabled-device account. Establishing the voice-enabled-device account may include establishing an association between the user account and the device identifier as well as associating preferences and/or settings with the user account. At block 322, the process 300 may include associating the device identifier with the voice-enabled-device account.

Returning to block 314, if the voice-enabled-device account was set up, then at block 324, the process 300 may include determining whether a network naming indicator associated with the voice-enabled-device account is the same as or similar to a network naming indicator being used to setup and/or use the voice-enabled device after being removed from the managed environment. If the naming indicator stored in association with the user account is not the same as or similar to the naming indicator of the network being used, then at block 326, the process 300 may include requesting setup of the voice-enabled device on the network being used. This process may include requesting a naming indicator associated with the network as well as authorization access credentials associated with the network.

If the naming indicator stored in association with the user account is the same as or similar to the naming indicator of the network being used, then at block 328, the process 300 may include automatically setting up the voice-enabled device on the network. For example, the remote system may select the network for communication of data with the voice-enabled device and may utilize stored authorization access information to gain access to the network and/or configure the voice-enabled device for operation.

At block 330, the process 300 may include charging the user account for purchase of the voice-enabled device. For example, a retail speechlet of the remote system may be configured to charge and/or otherwise access payment for the voice-enabled device. For example, one or more payment instruments may be associated with the user account and may be utilized by the retail speechlet to effectuate a transaction for the voice-enabled device. In some examples, the transaction may be between an account associated with the remote system and the user account. In other examples, the transaction may be between the default account and the user account. In these and other examples, the remote system may receive pricing information from the third-party system associated with the managed environment. By way of example, notification data may be sent to the third-party system associated with the default account that indicates the voice-enabled device has been dissociated from the default account. The notification may request pricing data indicating a price for the voice-enabled device. The retail speechlet may receive the pricing data and identify a payment instrument associated with the user account. The retail speechlet may utilize the payment instrument to cause a payment transaction to occur between the default account and the user account and/or an account associated with the remote system and the user account. In these and other examples, the retail speechlet may cause presentation of one or more options, such as on the personal device and/or the voice-enabled device, to allow a user to dispute the charging of their account for the voice-enabled device and/or to confirm charging before it occurs. In examples, instead of charging a user account as described herein, the remote system may be configured to send a notification that the device has been removed from the environment to the third-party system associated with the environment. Thereafter, the third-party system may take steps to charge the user, if desired, for the device.

Figure 4:
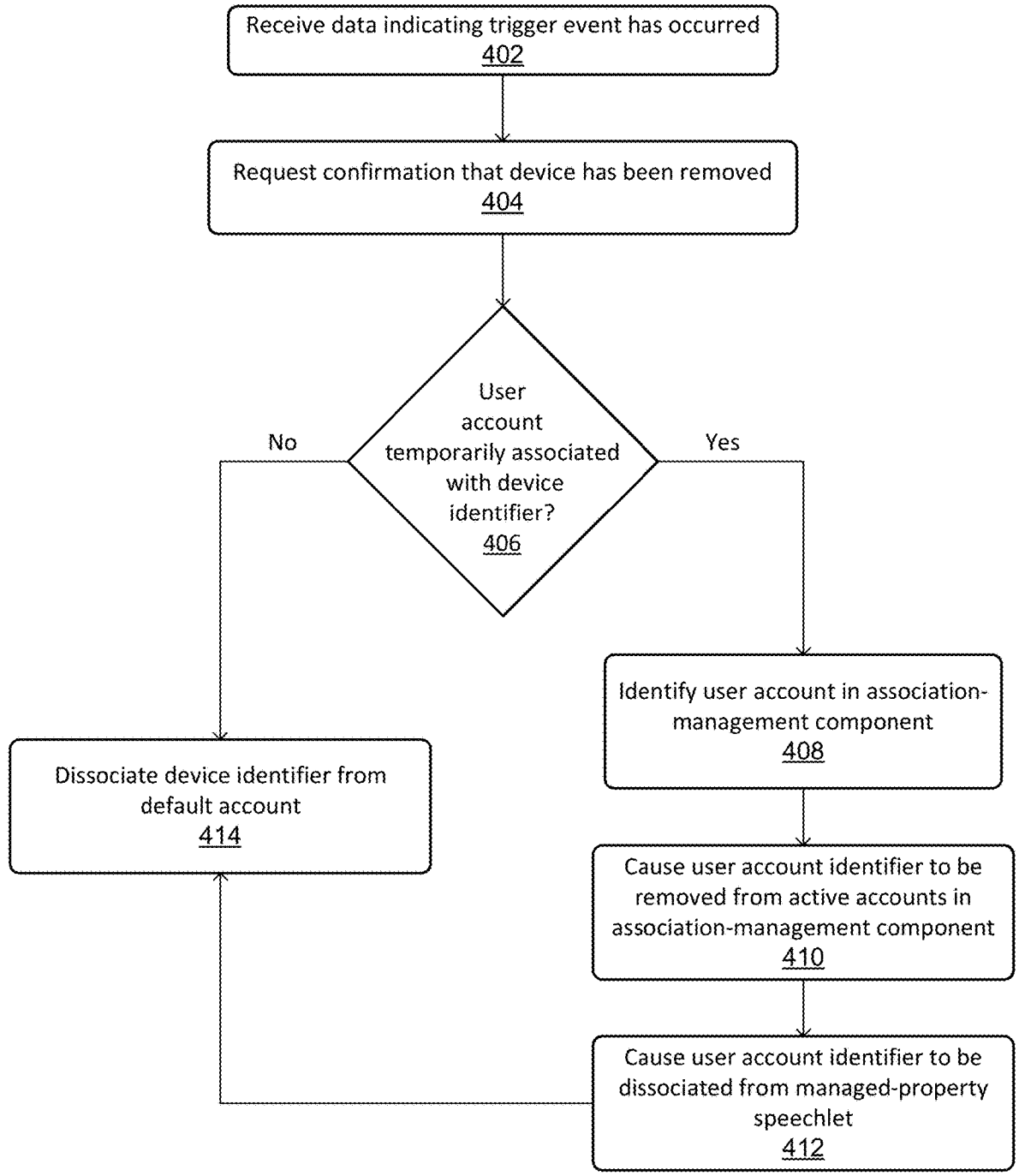
FIG. 4 illustrates a flow diagram of an example process for dissociating a device identifier from a default account associated with a managed property.

FIG. 4 illustrates a flow diagram of an example process 400 for dissociating a device identifier from a default account associated with a managed property. The order in which the operations or steps are described is not intended to be construed as a limitation, and any number of the described operations may be combined in any order and/or in parallel to implement process 400.

At block 402, the process 400 may include receiving data indicating that a trigger event has occurred. For example, a triggering event may occur that indicates a given voice-enabled device has been removed from the managed environment. For example, when the voice-enabled device is unplugged, communications between the voice-enabled device and the remote system and/or a third-party system associated with the hotel may cease. The cessation of such communications may act as the indication that the device has been removed from the environment. Additionally, or alternatively, the third-party system, based at least in part on visual inspection of the environment by an employee, for example, may provide the indication.

Additionally, or alternatively, the user may provide the indication via the voice-enabled device and/or the personal device. For example, the user may provide a user utterance of "I'm taking this device," or some other user utterance indicating an intent to remove the device from the environment. The remote system may process corresponding audio data to determine the intent to remove the device and may generate data indicating as much. By way of further example, the user may provide input to the application residing on and/or accessible to the personal device indicating the intent to remove the device, and the personal device may generate corresponding input data that may be sent to the remote system. Additionally, or alternatively, geolocation and/or global positioning system (GPS) data may be utilized to indicate when the device is removed from the environment. For example, the environment may be associated with a geographic location and the device may be equipped with geolocation components that communicate the geolocation of the device to the remote system. In instances where the geolocation of the device differs from the location of the environment, such as by a threshold distance for example, the indication that the device has been removed may be generated. Additionally, or alternatively, a network change may indicate that the device has been removed. For example, a first network may be associated with the hotel and may be utilized to send data to and receive data from the voice-enabled device. When the device is removed, a user may set up and/or attempt to set up the device for use with a second network, such as a network associated with the home of the user. The remote system may receive data indicating that the voice-enabled device is associated with the second network and/or the user is attempting to set up the device on the second network, and this data may be utilized to generate the indication that the device has been removed from the environment.

At block 404, the process 400 may include requesting confirmation that the voice-enabled device has been removed from the managed environment. For example, the remote system may request confirmation from the third-party system that the device has been removed and may receive data representing the confirmation. Additionally, or alternatively, the remote system may receive an indication that the voice-enabled device has been connected to a network other than the network associated with the managed environment, which may indicate confirmation that the device has been removed. Additionally, or alternatively, the remote system may request confirmation form a personal device associated with the user and/or from the voice-enabled device that the device has been removed and may receive data representing the confirmation. Additionally, or alternatively, the remote system may receive geolocation data associated with the device and determine that the geolocation of the device is outside an area associated with the third-party system.

At block 406, the process 400 may include determining whether a user account has been temporarily associated with the device identifier. For example, in instances where the voice-enabled device was temporarily associated with a user account of a user temporarily residing in the managed environment, the remote system may determine that the user account has been temporarily associated with the device identifier. In this way, the remote system may query the association-management component to determine if an active account is associated with the voice-enabled device. If there is an active account, a user account has been temporarily associated with the voice-enabled device. If there is no active account, the user account has not been associated with the voice-enabled device.

In examples where a user account has been temporarily associated with the device identifier of the voice-enabled device, the process 400 may continue to block 408, where the remote system may identify the user account corresponding to the active account in the association-management component. At block 410, the process 400 may include causing a user account identifier associated with the user account to be removed from the active accounts in the association-management component. For example, as described herein, the association-management component may store data indicating one or more active accounts associated with a voice-enabled device in a managed property. Based at least in part on the voice-enabled device being removed from the managed property, the user account corresponding to the active account may be dissociated from the association-management component.

At block 412, the process 400 may include causing the user account identifier to be dissociated from a managed-property speechlet. For example, the default account associated with the managed property may have access to and/or authorization to utilize a managed-property speechlet that allows for the use of various resources for responding to and/or taking action in response to user utterances. Based at least in part on the voice-enabled device being removed from the managed property, the user account may be dissociated from the managed-property speechlet.

At block 414, the process 400 may include dissociating the device identifier from the default account. For example, the voice-enabled device may have been associated with a default account associated with the managed environment. The association-management component of the remote system may be configured to dissociate the default account from the device identifier corresponding to the voice-enabled device such that the default account may not be utilized when processing user utterances.

Returning to block 406, if a user account was not temporarily associated with the device identifier, the process 400 may continue to block 414 where the device identifier may be dissociated from the default account, as described above.

Figure 5:
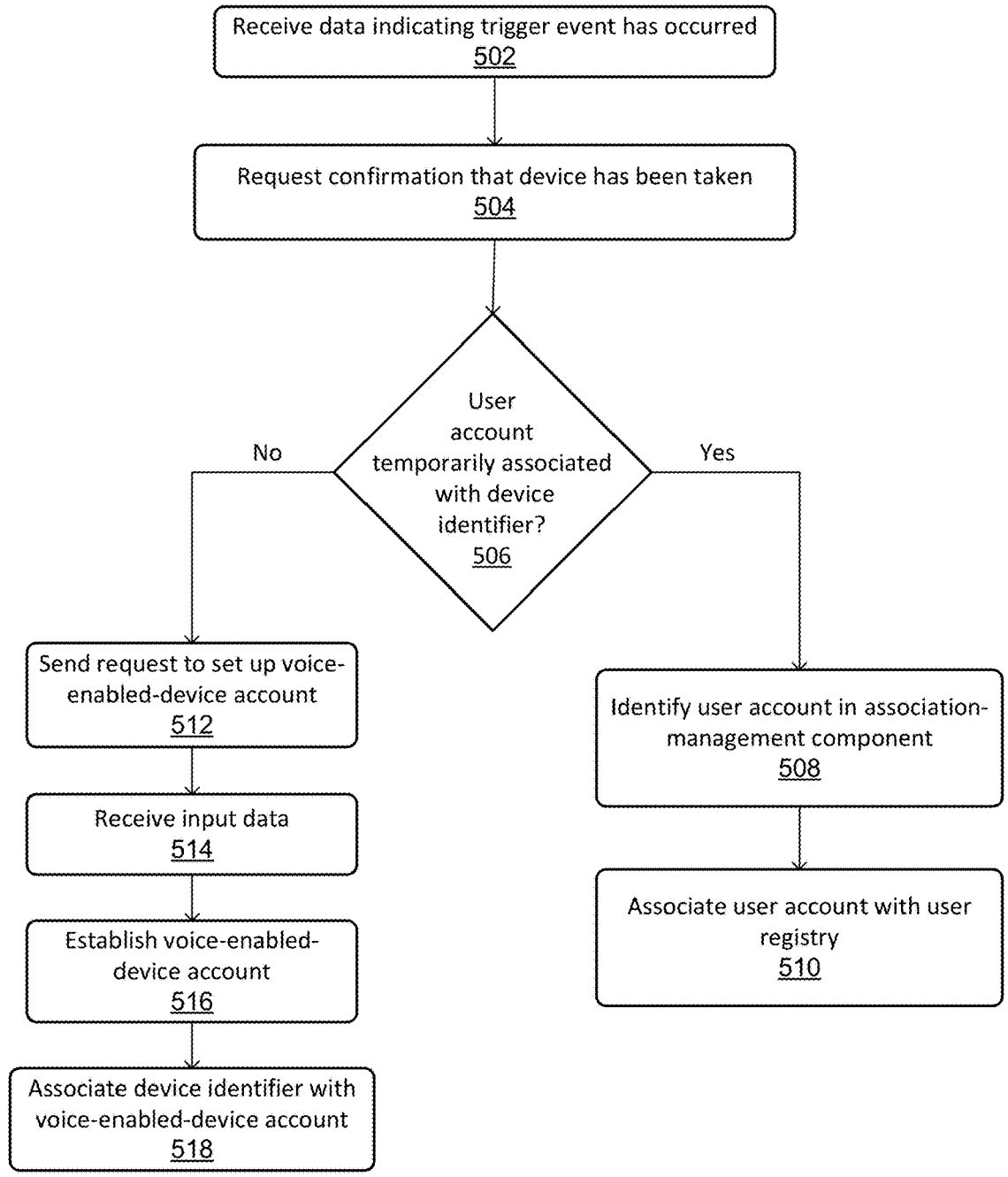
FIG. 5 illustrates a flow diagram of an example process for associating a device identifier with a user account when a voice-enabled device is removed from a managed property.

FIG. 5 illustrates a flow diagram of an example process 500 for associating a device identifier with a user account when a voice-enabled device is removed from a managed property. The order in which the operations or steps are described is not intended to be construed as a limitation, and any number of the described operations may be combined in any order and/or in parallel to implement process 500.

At block 502, the process 500 may include receiving data indicating that a trigger event has occurred. For example, a triggering event may occur that indicates a given voice-enabled device has been removed from the managed environment. For example, when the voice-enabled device is unplugged, communications between the voice-enabled device and the remote system and/or a third-party system associated with the hotel may cease. The cessation of such communications may act as the indication that the device has been removed from the environment. Additionally, or alternatively, the third-party system, based at least in part on visual inspection of the environment by an employee, for example, may provide the indication.

Additionally, or alternatively, the user may provide the indication via the voice-enabled device and/or the personal device. For example, the user may provide a user utterance of "I'm taking this device," or some other user utterance indicating an intent to remove the device from the environment. The remote system may process corresponding audio data to determine the intent to remove the device and may generate data indicating as much. By way of further example, the user may provide input to the application residing on and/or accessible to the personal device indicating the intent to remove the device, and the personal device may generate corresponding input data that may be sent to the remote system. Additionally, or alternatively, geolocation and/or global positioning system (GPS) data may be utilized to indicate when the device is removed from the environment. For example, the environment may be associated with a geographic location and the device may be equipped with geolocation components that communicate the geolocation of the device to the remote system. In instances where the geolocation of the device differs from the location of the environment, such as by a threshold distance for example, the indication that the device has been removed may be generated. Additionally, or alternatively, a network change may indicate that the device has been removed. For example, a first network may be associated with the hotel and may be utilized to send data to and receive data from the voice-enabled device. When the device is removed, a user may set up and/or attempt to set up the device for use with a second network, such as a network associated with the home of the user. The remote system may receive data indicating that the voice-enabled device is associated with the second network and/or the user is attempting to set up the device on the second network, and this data may be utilized to generate the indication that the device has been removed from the environment.

At block 504, the process 500 may include requesting confirmation that the voice-enabled device has been removed from the managed environment. For example, the remote system may request confirmation from the third-party system that the device has been removed and may receive data representing the confirmation. Additionally, or alternatively, the remote system may receive an indication that the voice-enabled device has been connected to a network other than the network associated with the managed environment, which may indicate confirmation that the device has been removed. Additionally, or alternatively, the remote system may request confirmation form a personal device associated with the user and/or from the voice-enabled device that the device has been removed and may receive data representing the confirmation. Additionally, or alternatively, the remote system may receive geolocation data associated with the device and determine that the geolocation of the device is outside an area associated with the third-party system.

At block 506, the process 500 may include determining whether a user account has been temporarily associated with the device identifier. For example, in instances where the voice-enabled device was temporarily associated with a user account of a user temporarily residing in the managed environment, the remote system may determine that the user account has been temporarily associated with the device identifier. In this way, the remote system may query the association-management component to determine if an active account is associated with the voice-enabled device. If there is an active account, a user account has been temporarily associated with the voice-enabled device. If there is no active account, the user account has not been associated with the voice-enabled device.

If there is no active account, then the process 500 may continue to block 508 where the remote system may identify the user account in the association-management component. At block 510, the process 500 may include associating the user account with a user registry of the remote system. For example, in instances where the user temporarily associated the user account with the device identifier during the user's stay at the managed environment, the remote system may utilize this information to identify the user account, such as in a user registry, and cause the device identifier to be associated with the user account. In these examples, data indicating the network associated with the user account and/or passwords and/or other access authorizations associated with the network may be stored in association with the user account. A configuration component of the remote system may be configured to utilize data associated with the user account stored, for example, in the user registry to configure the device to communicate via the user's network, such as without requiring setup by the user.

If, at block 506, the user account was not temporarily associated with the device identifier, then at block 512, the process 500 may include sending a request to set up a voice-enabled-device account. The request may comprise and/or include, for example, audio data for output of audio via speakers of the voice-enabled device and/or text data for presentation of text via a display of the voice-enabled device and/or a personal device of the user.

At block 514, the process 500 may include receiving input data representing a response to the request to set up the voice-enabled-device account. For example, the user may provide a user utterance and/or a tactile input in response to the request that includes information for establishing the voice-enabled-device account, account name, authorization access information, account preferences, a network naming indicator, and/or network authorization access credentials. Input data corresponding to the input may be generated and sent to the remote system.

At block 516, the process 500 may include establishing the voice-enabled-device account. Establishing the voiceenabled-device account may include establishing an association between the user account and the device identifier as well as associating preferences and/or settings with the user account. At block 518, the process 500 may include associating the device identifier with the voice-enabled-device account.

Figure 6:
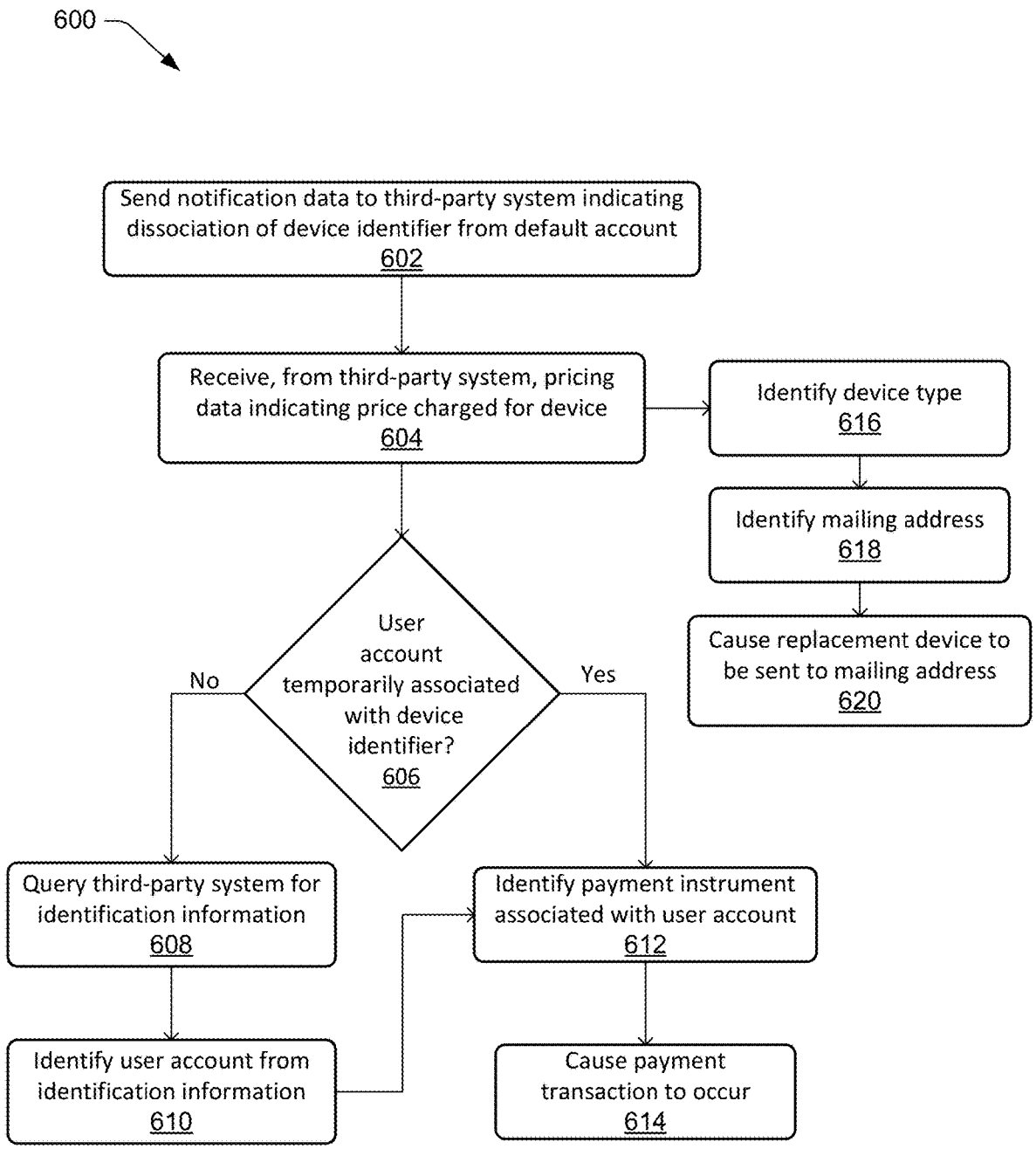
FIG. 6 illustrates a flow diagram of an example process for charging a user account for removal of a voice-enabled device and causing a replacement device to be sent to a mailing address associated with the managed property.

FIG. 6 illustrates a flow diagram of an example process 600 for charging a user account for removal of a voice-enabled device and causing a replacement device to be sent to a mailing address associated with the managed property. The order in which the operations or steps are described is not intended to be construed as a limitation, and any number of the described operations may be combined in any order and/or in parallel to implement process 600.

At block 602, the process 600 may include sending notification data to a third-party system indicating dissociation of a device identifier of a voice-enabled device from a default account associated with the third-party system. The notification data may comprise or include audio data for outputting audio of the notification, text data for presenting text of the notification, and/or other data for updating or otherwise revising a user interface showing device status.

At block 604, the process 600 may include receiving, from the third-party system, pricing data indicating a price charged for the voice-enabled device. For example, the third-party system may provide an indication of the price charged to users of a managed environment associated with the third-party system if those users take the voice-enabled devices. This price may correspond to an advertised price displayed, for example, within the managed environment. If the third-party system does not provide an indication of the price, the remote system may set and utilize a default price to be charged.

At block 606, the process 600 may include determining whether a user account has been temporarily associated with the device identifier. For example, in instances where the voice-enabled device was temporarily associated with a user account of a user temporarily residing in the managed environment, the remote system may determine that the user account has been temporarily associated with the device identifier. In this way, the remote system may query the association-management component to determine if an active account is associated with the voice-enabled device. If there is an active account, a user account has been temporarily associated with the voice-enabled device. If there is no active account, the user account has not been associated with the voice-enabled device.

At block 608, if there is no active account, the remote system may query a third-party system associated with the voice-enabled device for identification information. For example, the third-party system may have acquired identifying information during the check-in process for the user to temporarily stay at the managed environment. The third-party system may provide that information to the remote system for purposes of identifying the user. This information may only be shared with the third-party system with authorization from the user, such as given to the third-party system. Additional safeguards may be implemented to ensure that any information associated with the user and/or user accounts is transmitted to and/or from the remote system in a transparent and authorized manner. These safeguards may include receive express permissions from users to transmit data, confirming permissions provided to third-party systems, sending alerts to user devices indicating when information has been shared, with whom, and/or what information was provided, providing users the ability to request that information be returned to the user and/or user account, etc. Additionally, the remote system may be configured to send such information in encrypted formats and/or to redact or otherwise refrain from sending information not useful for the processes described herein.

At block 610, the process 600 may include identifying the user account from the identification information. For example, at least a portion of the user information may be analyzed with respect to one or more user accounts to determine which user account is most closely associated with the identification information. By way of example, the identification information may include a name of the user, an address associated with the user, and/or payment instruments associated with the user. This information may be analyzed with respect to information stored in user accounts to determine which user account includes such information.

At block 612, the process 600 may include identifying a payment instrument associated with the user account. Additionally, if, at block 606, the user account was determined to be temporarily associated with the device identifier, the process may proceed to block 612. For example, the user account may have one or more payment instruments and/or information related thereto stored with respect to the user account. This information may be stored based at least in part on a user request to store such information and/or the user's acceptance of an option to store such information.

At block 614, the process 600 may include causing a payment transaction to occur. For example, a retail speechlet of the remote system may be configured to charge and/or otherwise access payment for the voice-enabled device. For example, the one or more payment instruments may be associated with the user account and may be utilized by the retail speechlet to effectuate a transaction for the voice-enabled device. In some examples, the transaction may be between an account associated with the remote system and the user account. In other examples, the transaction may be between the default account and the user account. In these and other examples, the remote system may receive pricing information from the third-party system associated with the managed environment. By way of example, notification data may be sent to the third-party system associated with the default account that indicates the voice-enabled device has been dissociated from the default account. The notification may request pricing data indicating a price for the voice-enabled device. The retail speechlet may receive the pricing data and identify a payment instrument associated with the user account. The retail speechlet may utilize the payment instrument to cause a payment transaction to occur between the default account and the user account and/or an account associated with the remote system and the user account. In these and other examples, the retail speechlet may cause presentation of one or more options, such as on the personal device and/or the voice-enabled device, to allow a user to dispute the charging of their account for the voice-enabled device and/or to confirm charging before it occurs. In examples, instead of charging a user account as described herein, the remote system may be configured to send a notification that the device has been removed from the environment to the third-party system associated with the environment. Thereafter, the third-party system may take steps to charge the user, if desired, for the device.

Additionally, or alternatively, at block 616, the process 600 may include identifying a device type associated with the voice-enabled device and/or modalities of the voice-enabled device. For example, various versions of voice-enabled devices may be offered and some or all of these voice-enabled devices may have various modalities, such as the capability to output only audio, only image, or both audio and images.

At block 618, the process 600 may include identifying a mailing address associated with the third-party system. This operation may include requesting the mailing address from the third-party system, analyzing external databases to harvest the mailing address, and/or receiving the mailing address from a database associated with the default account of the third-party system.

At block 620, the process 600 may include causing the replacement device to be sent to the mailing address. For example, the retail speechlet and/or one or more other components of the remote system may be configured to cause a replacement voice-enabled device to be sent to a mailing address associated with the third-party system. For example, one or more repurchase settings associated with the third-party system may be utilized to determine if the third-party system has indicated that a replacement device should be sent when the voice-enabled device is removed from the managed environment. In other examples, the remote system may receive a request for a replacement device from the third-party system. The remote system may request a mailing address associated with the third-party system with which to send the replacement device and/or the remote system may identify and/or determine a device type of the voice-enabled device that was removed. The remote system may utilize this information to cause the replacement voice-enabled device to be sent to the mailing address. For example, an order may be generated to replace the device, and the order may be utilized by one or more systems and/or persons to effectuate sending the replacement device. In examples, information associated with the location of the voice-enabled device prior to being removed may be sent in addition to sending the replacement device. This information may be utilized to determine where the replacement device should be positioned within the managed environment.

Figure 7:
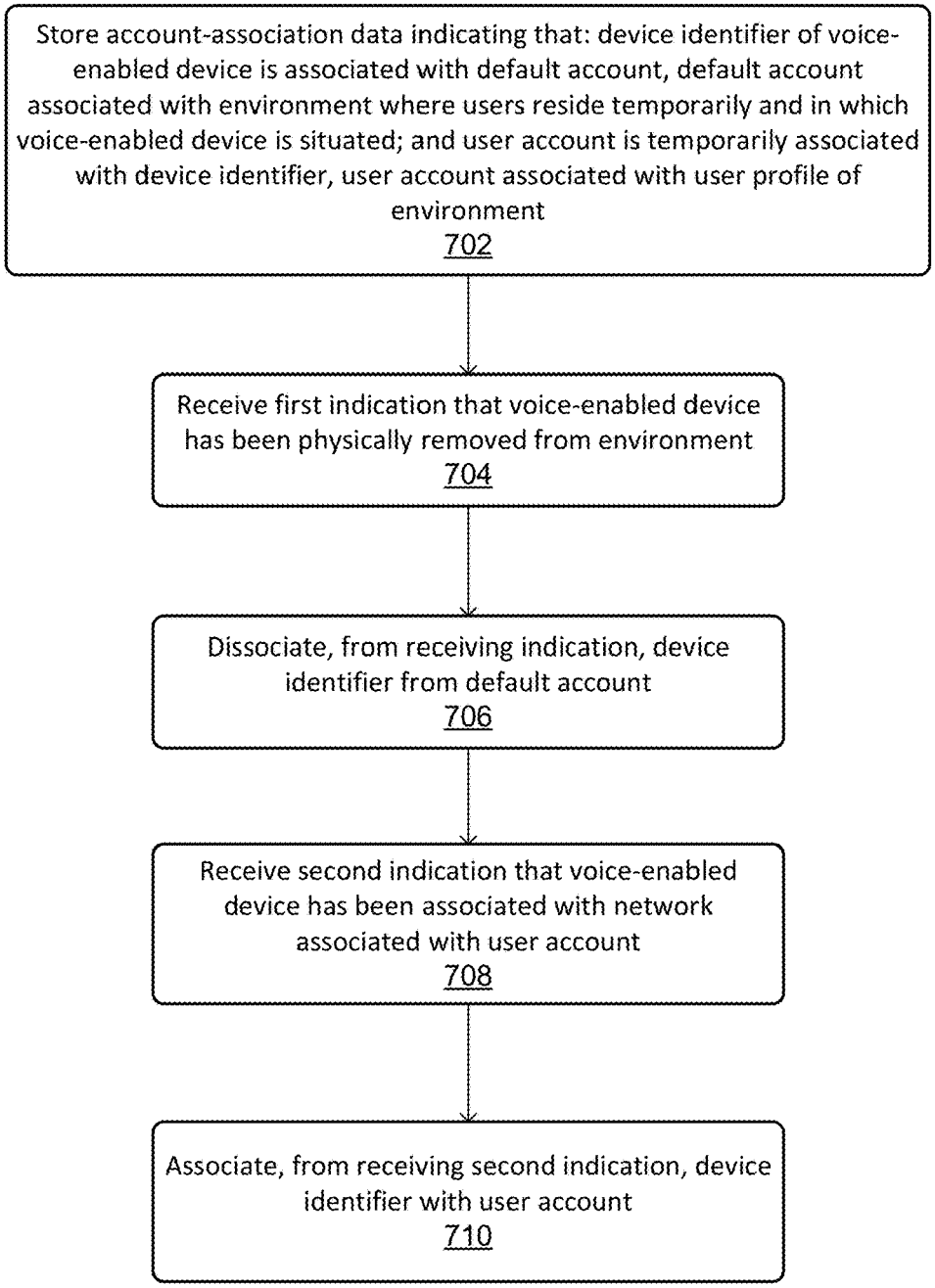
FIG. 7 illustrates a flow diagram of an example process for account association with voice-enabled devices.

FIG. 7 illustrates a flow diagram of an example process 700 for account association with voice-enabled devices. The order in which the operations or steps are described is not intended to be construed as a limitation, and any number of the described operations may be combined in any order and/or in parallel to implement process 700.

At block 702, the process 700 may include storing account-association data indicating that: a device identifier of a voice-enabled device is associated with a default account, the default account associated with an environment in which users reside temporarily and in which the voice-enabled device is situated; and a user account is temporarily associated with the device identifier, the user account associated with a user profile associated with, for example, transient user of the environment. For example, account-association data may be stored with respect to an association-management component of a remote system associated with a voice-enabled device. The association-management component may identify a default account associated with a third-party system and/or a managed environment in which the voice-enabled device is situated. The association-management component may further identify an "active account" associated with the voice-enabled device. The active account may correspond to a temporary association of the voice-enabled device with a user account of a user temporarily residing in the managed environment.

At block 704, the process 700 may include receiving a first indication that the voice-enabled device has been removed from the environment. For example, a triggering event may occur that indicates a given voice-enabled device has been removed from the managed environment. For example, when the voice-enabled device is unplugged, communications between the voice-enabled device and the remote system and/or a third-party system associated with the hotel may cease. The cessation of such communications may act as the indication that the device has been removed from the environment. Additionally, or alternatively, the third-party system, based at least in part on visual inspection of the environment by an employee, for example, may provide the indication.

Additionally, or alternatively, the user may provide the indication via the voice-enabled device and/or the personal device. For example, the user may provide a user utterance of "I'm taking this device," or some other user utterance indicating an intent to remove the device from the environment. The remote system may process corresponding audio data to determine the intent to remove the device and may generate data indicating as much. By way of further example, the user may provide input to the application residing on and/or accessible to the personal device indicating the intent to remove the device, and the personal device may generate corresponding input data that may be sent to the remote system. Additionally, or alternatively, geolocation and/or global positioning system (GPS) data may be utilized to indicate when the device is removed from the environment. For example, the environment may be associated with a geographic location and the device may be equipped with geolocation components that communicate the geolocation of the device to the remote system. In instances where the geolocation of the device differs from the location of the environment, such as by a threshold distance for example, the indication that the device has been removed may be generated. Additionally, or alternatively, a network change may indicate that the device has been removed. For example, a first network may be associated with the hotel and may be utilized to send data to and receive data from the voice-enabled device. When the device is removed, a user may set up and/or attempt to set up the device for use with a second network, such as a network associated with the home of the user. The remote system may receive data indicating that the voice-enabled device is associated with the second network and/or the user is attempting to set up the device on the second network, and this data may be utilized to generate the indication that the device has been removed from the environment.

At block 706, the process 700 may include dissociating, from receiving the indication, the device identifier from the default account. For example, the voice-enabled device may have been associated with a default account associated with the managed environment. The association-management component of the remote system may be configured to dissociate the default account from the device identifier corresponding to the voice-enabled device such that the default account may not be utilized when processing user utterances. Additionally, or alternatively, the device identifier may be dissociated from a managed-property speechlet of the remote system and, in instances where the user account is temporarily associated with the device identifier associated with the device, the association-management component may remove and/or transfer data indicating the active account. In this way, the voice-enabled device and its related device identifier may be dissociated from the managed environment and/or its components and/or speechlets.

At block 708, the process 700 may include receiving a second indication that the voice-enabled device has been associated with a network associated with the user account.

For example, a user may set up and/or attempt to set up the device for use with a personal network, such as a network associated with the home of the user. The remote system may receive data indicating that the voice-enabled device is associated with the second network and/or the user is attempting to set up the device on the second network, and this data may include the second indication that the voice-enabled device has been associated with a network associated with the user account.

At block 710, the process 700 may include associating, from receiving the second indication, the device identifier with the user account. For example, in instances where the user temporarily associated the user account with the device identifier during the user's stay at the managed environment, the remote system may utilize this information to identify the user account, such as in a user registry, and cause the device identifier to be associated with the user account. In these examples, data indicating the network associated with the user account and/or passwords and/or other access authorizations associated with the network may be stored in association with the user account. A configuration component of the remote system may be configured to utilize data associated with the user account stored, for example, in the user registry to configure the device to communicate via the user's network, such as without requiring setup by the user.

Additionally, or alternatively, the process 700 may include sending notification data to a third-party system associated with the default account. The notification data may indicate that the voice-enabled device is dissociated from the default account and/or the notification data may request pricing data indicating a price for the voice-enabled device. The process 700 may also include receiving, from the third-party system, the pricing data and identifying a payment instrument associated with the user account. The process 700 may also include causing a payment transaction to occur, using the payment instrument and the price, between the default account and the user account.

Additionally, or alternatively, the process 700 may include determining that the default account is associated with an account setting indicating authorization to send a second voice-enabled device to replace the first voice-enabled device. The process 700 may also include identifying, from the device identifier, a device type of the first voice-enabled device and identifying a mailing address associated with the default account. The process 700 may also include causing, based at least in part on determining that the default account is associated with the account setting, the second voice-enabled device of the device type to be sent to the mailing address.

Additionally, or alternatively, the process 700 may include identifying, based at least in part on the second indication, a communications access-point naming indicator associated with the network and determining that the user account is associated with the communications access-point naming indicator. The process 700 may also include causing, based at least in part on the user account being associated with the communications access-point naming indicator, the voice-enabled device to be configured to send and receive data using the network.

Additionally, or alternatively, the process 700 may include identifying one or more access credentials associated with a user account. The credentials may include, for example, a username and/or password for accessing or otherwise connecting to a network, such as a local wireless network. The network may be associated with a communications access-point naming indicator. The process 700 may also include sending data representing the credentials to the voice-enabled device, such as based at least in part on the user account being temporarily associated with the voice-enabled device and/or the device identifier. The credentials may be secured and/or encrypted and stored locally on memory of the voice-enabled device. If the system determines that the device is not removed from the environment, such as in situations where a user may checkout or otherwise depart the environment without taking the device, the data representing the credentials may be deleted from the memory of the voice-enabled device. If the device is removed from the environment, upon being plugged in or otherwise powered up in a new environment, such as a user's home and/or office, the device may identify the communications access-point associated with the environment and may decrypt the data representing the credentials. The credentials may then be utilized to connect to the network without user input, for example. Additional safeguards may be implemented to ensure that any information associated with the user and/or user accounts is transmitted to and/or from the remote system in a transparent and authorized manner. These safeguards may include receive express permissions from users to transmit data, confirming permissions provided to third-party systems, sending alerts to user devices indicating when information has been shared, with whom, and/or what information was provided, providing users the ability to request that information be returned to the user and/or user account, etc. Additionally, the remote system may be configured to send such information in encrypted formats and/or to redact or otherwise refrain from sending information not useful for the processes described herein.

Additionally, or alternatively, the process 800 may include determining that data has ceased being transmitted from the voice-enabled device. For example, the device may be unplugged, transitioned to an offline mode, or otherwise have communication with the remote system severed. The process 800 may also include sending, to a system associated with the environment and based at least in part on determining that the data has ceased being transmitted, notification data requesting confirmation that the voice-enabled device has been physically removed from the environment. The process 800 may also include receiving, from the system associated with the environment, response data confirming that the voice-enabled device has been physically removed from the environment. In these examples, dissociating the device identifier from the default account and/or associating the device identifier with the user account may be based at least in part on the response data.

Figure 8:
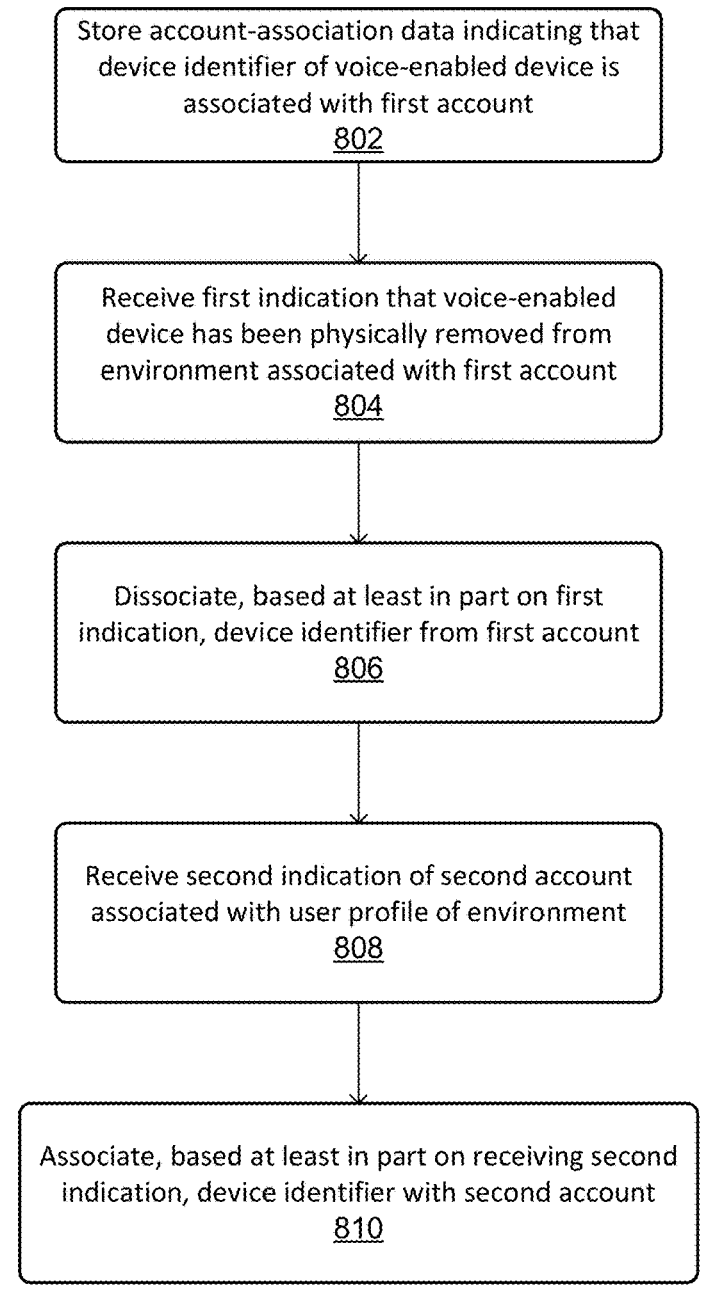
FIG. 8 illustrates a flow diagram of another example process for account association with voice-enabled devices.

FIG. 8 illustrates a flow diagram of another example process 800 for account association with voice-enabled devices. The order in which the operations or steps are described is not intended to be construed as a limitation, and any number of the described operations may be combined in any order and/or in parallel to implement process 800.

At block 802, the process 800 may include storing account-association data indicating that a device identifier of a voice-enabled device is associated with a first account. For example, account-association data may be stored with respect to an association-management component of a remote system associated with a voice-enabled device. The association-management component may identify a default account associated with a third-party system and/or a managed environment in which the voice-enabled device is situated.

At block 804, the process 800 may include receiving a first indication that the voice-enabled device has been physically removed from an environment associated with the first account. For example, a triggering event may occur that indicates a given voice-enabled device has been removed from the managed environment. For example, when the voice-enabled device is unplugged, communications between the voice-enabled device and the remote system and/or a third-party system associated with the hotel may cease. The cessation of such communications may act as the indication that the device has been removed from the environment. Additionally, or alternatively, the third-party system, based at least in part on visual inspection of the environment by an employee, for example, may provide the indication.

Additionally, or alternatively, the user may provide the indication via the voice-enabled device and/or the personal device. For example, the user may provide a user utterance of "I'm taking this device," or some other user utterance indicating an intent to remove the device from the environment. The remote system may process corresponding audio data to determine the intent to remove the device and may generate data indicating as much. By way of further example, the user may provide input to the application residing on and/or accessible to the personal device indicating the intent to remove the device, and the personal device may generate corresponding input data that may be sent to the remote system. Additionally, or alternatively, geolocation and/or global positioning system (GPS) data may be utilized to indicate when the device is removed from the environment. For example, the environment may be associated with a geographic location and the device may be equipped with geolocation components that communicate the geolocation of the device to the remote system. In instances where the geolocation of the device differs from the location of the environment, such as by a threshold distance for example, the indication that the device has been removed may be generated. Additionally, or alternatively, a network change may indicate that the device has been removed. For example, a first network may be associated with the hotel and may be utilized to send data to and receive data from the voice-enabled device. When the device is removed, a user may set up and/or attempt to set up the device for use with a second network, such as a network associated with the home of the user. The remote system may receive data indicating that the voice-enabled device is associated with the second network and/or the user is attempting to set up the device on the second network, and this data may be utilized to generate the indication that the device has been removed from the environment.

At block 806, the process 800 may include dissociating, based at least in part on the first indication, the device identifier from the first account. For example, the voice-enabled device may have been associated with a default account associated with the managed environment. The association-management component of the remote system may be configured to dissociate the default account from the device identifier corresponding to the voice-enabled device such that the default account may not be utilized when processing user utterances. Additionally, or alternatively, the device identifier may be dissociated from a managed-property speechlet of the remote system and, in instances where the user account is temporarily associated with the device identifier associated with the device, the association-management component may remove and/or transfer data indicating the active account. In this way, the voice-enabled device and its related device identifier may be dissociated from the managed environment and/or its components and/or speechlets.

At block 808, the process 800 may include receiving a second indication of a second account associated with a user profile of the environment. For example, the association-management component may further identify an "active account" associated with the voice-enabled device. The active account may correspond to a temporary association of the voice-enabled device with a user account of a user temporarily residing in the managed environment.

At block 810, the process 800 may include associating, based at least in part on receiving the second indication, the device identifier with the second account. For example, in instances where the user temporarily associated the user account with the device identifier during the user's stay at the managed environment, the remote system may utilize this information to identify the user account, such as in a user registry, and cause the device identifier to be associated with the user account. In these examples, data indicating the network associated with the user account and/or passwords and/or other access authorizations associated with the network may be stored in association with the user account. A configuration component of the remote system may be configured to utilize data associated with the user account stored, for example, in the user registry to configure the device to communicate via the user's network, such as without requiring setup by the user.

Additionally, or alternatively, the process 800 may include sending notification data to a third-party system associated with the default account. The notification data may indicate that the voice-enabled device is dissociated from the default account and/or the notification data may request pricing data indicating a price for the voice-enabled device. The process 800 may also include receiving, from the third-party system, the pricing data and identifying a payment instrument associated with the user account. The process 800 may also include causing a payment transaction to occur, using the payment instrument and the price, between the default account and the user account.

Additionally, or alternatively, the process 800 may include determining that the default account is associated with an account setting indicating authorization to send a second voice-enabled device to replace the first voice-enabled device. The process 800 may also include identifying, from the device identifier, a device type of the first voice-enabled device and identifying a mailing address associated with the default account. The process 800 may also include causing, based at least in part on determining that the default account is associated with the account setting, the second voice-enabled device of the device type to be sent to the mailing address.

Additionally, or alternatively, the process 800 may include sending, to a personal device associated with the user account, a communication requesting authority to associate the device identifier with the second account and receiving, from the personal device, input data representing a response to the communication. In these examples, associating the device identifier with the user account may be based at least in part on the input data.

Additionally, or alternatively, the process 800 may include receiving, from the voice-enabled device, audio data representing a user utterance and determining intent data, based at least in part on the audio data, indicating an intent to remove the voice-enabled device from the environment. In these examples, dissociating the device identifier from the default account may be based at least in part on the intent and/or associating the device identifier with the user account may be based at least in part on the intent.

Additionally, or alternatively, the process 800 may include determining that a second voice-enabled device is associated with the user account and identifying device-configuration settings associated with the second voice-enabled device. The process 800 may also include causing the first voice-enabled device to be configured with at least a portion of the device-configuration settings.

Additionally, or alternatively, the process 800 may include receiving a third indication that the voice-enabled device is being configured for use in a second environment associated with the user account and determining that the user account is unassociated with a second voice-enabled device. The process 800 may also include sending, to the voice-enabled device and based at least in part on determining that the user account is unassociated with the second voice-enabled device, audio data representing a request for input associated with device-configuration settings. The process 800 may also include receiving, from at least one of the voice-enabled device or a personal device associated with the user account, input data representing the device-configuration settings and causing the first voice-enabled device to be configured with at least a portion of the device-configuration settings.

Additionally, or alternatively, the process 700 may include identifying, based at least in part on the second indication, a communications access-point naming indicator associated with the network and determining that the user account is associated with the communications access-point naming indicator. The process 700 may also include causing, based at least in part on the user account being associated with the communications access-point naming indicator, the voice-enabled device to be configured to send and receive data using the network.

Figure 9:
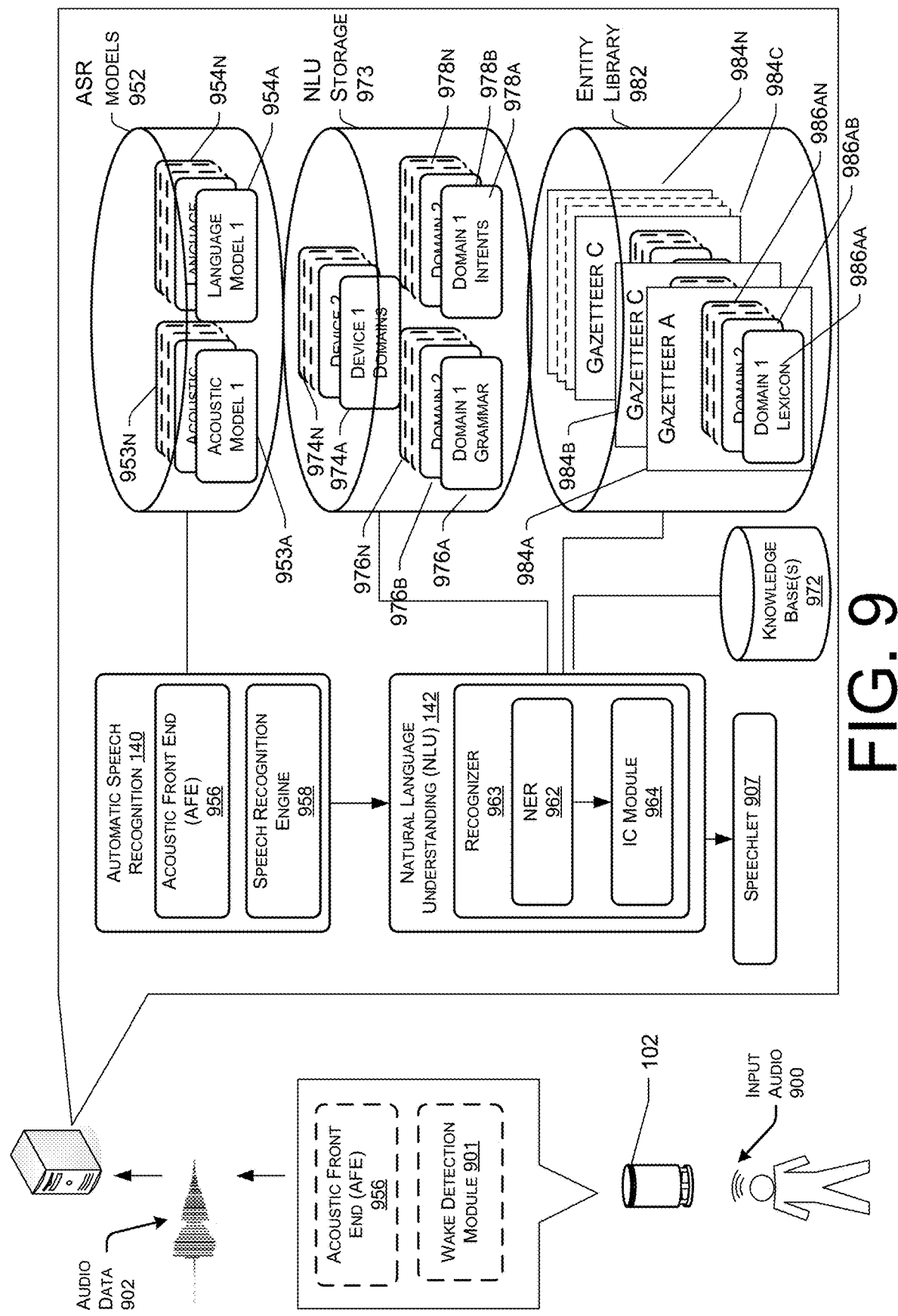
FIG. 9 illustrates a conceptual diagram of components of a speech-processing system for processing audio data provided by one or more devices.

FIG. 9 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as system 120). The various components illustrated may be located on a same or different physical devices. Message between various components illustrated in FIG. 9 may occur directly or across a network 122, 158. An audio capture component, such as a microphone 114 of the device 102, or another device, captures audio 900 corresponding to a spoken utterance. The device 102, using a wakeword detection module 901, then processes audio data corresponding to the audio 900 to determine if a keyword (such as a wakeword) is detected in the audio data. Following detection of a wakeword, the device 102 sends audio data 902 corresponding to the utterance to the remote system 120 that includes an ASR module 140. The audio data 902 may be output from an optional acoustic front end (AFE) 956 located on the device prior to transmission. In other instances, the audio data 902 may be in a different form for processing by a remote AFE 956, such as the AFE 956 located with the ASR module 140 of the remote system 120.

The wakeword detection module 901 works in conjunction with other components of the user device, for example a microphone to detect keywords in audio 900. For example, the device may convert audio 900 into audio data, and process the audio data with the wakeword detection module 901 to determine whether human sound is detected, and if so, if the audio data comprising human sound matches an audio signature and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input: the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wakeword detection module 901 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 901 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake" and begin transmitting audio data 902 corresponding to input audio 900 to the remote system 120 for speech processing. Audio data corresponding to that audio may be sent to remote system 120 for routing to a recipient device or may be sent to the remote system 120 for speech processing for interpretation of the included speech (either for purposes of enabling voice-messages and/or for purposes of executing a command in the speech). The audio data 902 may include data corresponding to the wakeword, or the portion of the audio data corresponding to the wakeword may be removed by the local device 102 prior to sending. Further, a local device may "wake" upon detection of speech/spoken audio above a threshold, as described herein. Upon receipt by the remote system 120, an ASR module 140 may convert the audio data 902 into text. The ASR transcribes audio data into text data representing the words of the speech contained in the audio data 902. The text data may then be used by other components for various purposes, such as executing system commands, inputting data, etc. A spoken utterance in the audio data is input to a processor configured to perform ASR which then interprets the utterance based on the similarity between the utterance and pre-established language models 954 stored in an ASR model knowledge base (ASR Models Storage 952). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 953 stored in an ASR Models Storage 952), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 140 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 956 and a speech recognition engine 958. The acoustic front end (AFE) 956 transforms the audio data from the microphone into data for processing by the speech recognition engine 958. The speech recognition engine 958 compares the speech recognition data with acoustic models 953, language models 954, and other data models and information for recognizing the speech conveyed in the audio data. The AFE 956 may reduce noise in the audio data and divide the digitized audio data into frames representing time intervals for which the AFE 956 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 958 may process the output from the AFE 956 with reference to information stored in speech/model storage (952). Alternatively, post front-end processed data (such as feature vectors) may be received by the device executing ASR processing from another source besides the internal AFE. For example, the user device may process audio data into feature vectors (for example using an on-device AFE 956) and transmit that information to a server across a network for ASR processing. Feature vectors may arrive at the remote system 120 encoded, in which case they may be decoded prior to processing by the processor executing the speech recognition engine 958.

The speech recognition engine 958 attempts to match received feature vectors to language phonemes and words as known in the stored acoustic models 953 and language models 954. The speech recognition engine 958 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, I'm taking this device." The wake detection module may identify the wake word, otherwise described as a trigger expression, "Alexa," in the user utterance and may "wake" based on identifying the wake word. Audio data corresponding to the user utterance may be sent to the remote system 120, where the speech recognition engine 958 may identify, determine, and/or generate text data corresponding to the user utterance, here "I'm taking this device."

The speech recognition engine 958 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 958 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 120, for natural language understanding (NLU) processing, such as conversion of the text into commands for execution, either by the user device, by the remote system 120, or by another device (such as a server running a specific application like a search engine, etc.).

The device performing NLU processing 142 (e.g., server 120) may include various components, including potentially dedicated processor(s), memory, storage, etc. As shown in FIG. 9, an NLU component 142 may include a recognizer 963 that includes a named entity recognition (NER) module 962 which is used to identify portions of query text that correspond to a named entity that may be recognizable by the system. A downstream process called named entity resolution links a text portion to a specific entity known to the system. To perform named entity resolution, the system may utilize gazetteer information (984a-984n) stored in entity library storage 982. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 140 based on the utterance input audio 900) and attempts to make a semantic interpretation of the text. That is, the NLU process determines the meaning behind the text based on the individual words and then implements that meaning. NLU processing 142 interprets a text string to derive an intent or a desired action from the user as well as the pertinent pieces of information in the text that allow a device (e.g., device 102) to complete that action. For example, if a spoken utterance is processed using ASR 140 and outputs the text "I'm taking this device" the NLU process may determine that the user intended to indicate that he/she would like to make the voice-enabled device his/her personal voice-enabled device and remove it from a managed environment.

The NLU may process several textual inputs related to the same utterance. For example, if the ASR 140 outputs N text segments (as part of an N-best list), the NLU may process all N outputs to obtain NLU results.

As will be discussed further below, the NLU process may be configured to parse and tag to annotate text as part of NLU processing. For example, for the text "I'm taking this device," "I'm taking" may be tagged as a command (to associate the user's account) and "this device" may be tagged as the identifier of the voice-enabled device to be taken from the managed environment.

To correctly perform NLU processing of speech input, an NLU process 142 may be configured to determine a "domain" of the utterance so as to determine and narrow down which services offered by the endpoint device (e.g., remote system 120 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) module 962 receives a query in the form of ASR results and attempts to identify relevant grammars and lexical information that may be used to construe meaning. To do so, the NLU module 142 may begin by identifying potential domains that may relate to the received query. The NLU storage 973 includes a database of devices (974a-974n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "shopping," "music," "calendaring," etc. As such, each domain may be associated with a particular recognizer 963, language model and/or grammar database (976a-976n), a particular set of intents/actions (978a-978n), and a particular personalized lexicon (986). Each gazetteer (984a-984n) may include domain-indexed lexical information associated with a particular user and/or device. For example, the Gazetteer A (984a) includes domain-index lexical information 986aa to 986an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) module 964 parses the query to determine an intent or intents for each identified domain, where the intent corresponds to the action to be performed that is responsive to the query. Each domain is associated with a database (978a-978n) of words linked to intents. For example, a music intent database may link words and phrases such as "quiet," "volume off," and "mute" to a "mute" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC module 964 identifies potential intents for each identified domain by comparing words in the query to the words and phrases in the intents database 978. In some instances, the determination of an intent by the IC module 964 is performed using a set of rules or templates that are processed against the incoming text to identify a matching intent.

In order to generate a particular interpreted response, the NER 962 applies the grammar models and lexical information associated with the respective domain to actually recognize a mention of one or more entities in the text of the query. In this manner, the NER 962 identifies "slots" or values (i.e., particular words in query text) that may be needed for later command processing. Depending on the complexity of the NER 962, it may also label each slot with a type of varying levels of specificity (such as noun, place, city, artist name, song name, amount of time, timer number, or the like). Each grammar model 976 includes the names of entities (i.e., nouns) commonly found in speech about the particular domain (i.e., generic terms), whereas the lexical information 986 from the gazetteer 984 is personalized to the user(s) and/or the device. For instance, a grammar model associated with the shopping domain may include a database of words commonly used when people discuss shopping.

The intents identified by the IC module 964 are linked to domain-specific grammar frameworks (included in 976) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "play Song A" is an identified intent, a grammar (976) framework or frameworks may correspond to sentence structures such as "play {Song A}."

For example, the NER module 962 may parse the query to identify words as subject, object, verb, preposition, etc., based on grammar rules and/or models, prior to recognizing named entities. The identified verb may be used by the IC module 964 to identify intent, which is then used by the NER module 962 to identify frameworks. A framework for the intent of "play a song," meanwhile, may specify a list of slots/fields applicable to play the identified "song" and any object modifier (e.g., specifying a music collection from which the song should be accessed) or the like. The NER module 962 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER module 962 may search the database of generic words associated with the domain (in the knowledge base 972). So, for instance, if the query was "play Song A," after failing to determine which song to play, the NER component 962 may search the domain vocabulary for the phrase "Song A". In the alternative, generic words may be checked before the gazetteer information, or both may be tried, potentially producing two different results.

The output data from the NLU processing (which may include tagged text, commands, etc.) may then be sent to a speechlet 907. The destination speechlet 907 may be determined based on the NLU output. For example, if the NLU output includes a command to send a message, the destination speechlet 907 may be a message sending application, such as one located on the user device or in a message sending appliance, configured to execute a message sending command. If the NLU output includes a search request, the destination speechlet 907 may include a search engine processor, such as one located on a search server, configured to execute a search command. After the appropriate command is generated based on the intent of the user, the speechlet 907 may provide some or all of this information to a text-to-speech (TTS) engine 144. The TTS engine 144 may then generate an actual audio file for outputting the audio data determined by the speechlet 907 (e.g., "this is now your device," or "thank you for selecting this device"). After generating the file (or "audio data"), the TTS engine 144 may provide this data back to the remote system 120.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 142 during runtime operations where NLU operations are performed on text (such as text output from an ASR component 140). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 963. Each recognizer may include various NLU components such as an NER component 962, IC module 964 and other components such as an entity resolver, or other components.

For example, a messaging domain recognizer 963-A (Domain A) may have an NER component 962-A that identifies what slots (i.e., portions of input text) may correspond to particular words relevant to that domain. The words may correspond to entities such as (for the messaging domain) a recipient. An NER component 962 may use a machine learning model, such as a domain specific conditional random field (CRF) to both identify the portions corresponding to an entity as well as identify what type of entity corresponds to the text portion. The messaging domain recognizer 963-A may also have its own intent classification (IC) component 964-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 120 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the remote system 120, as illustrated herein are exemplary, and may be located in a stand-alone device or may be included, in whole or in part, as a component of a larger device or system, may be distributed across a network or multiple devices connected by a network, etc.

Figure 10:
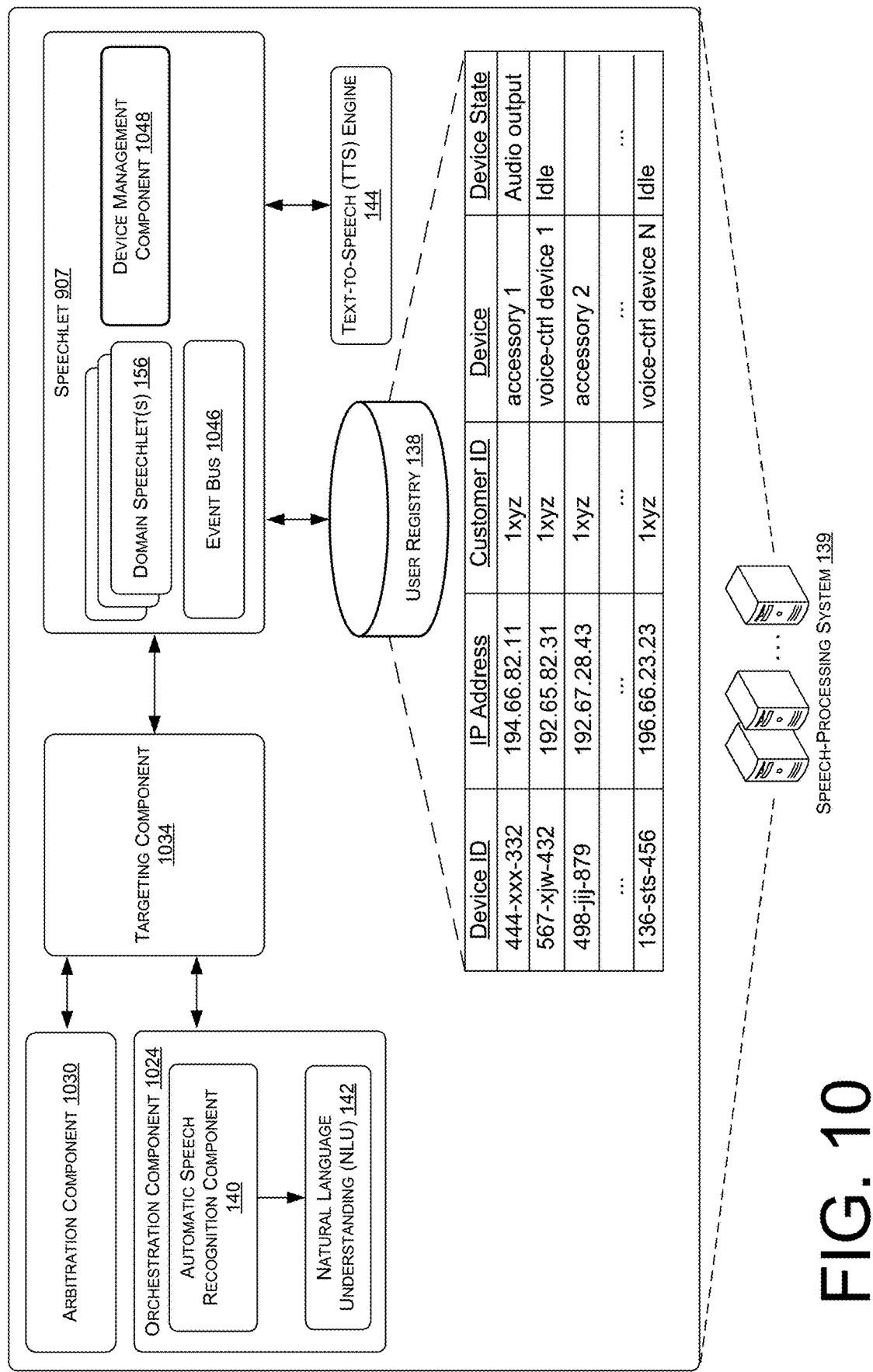
FIG. 10 illustrates a conceptual diagram of components of a speech-processing system for account association with voice-enabled devices.

FIG. 10 illustrates a conceptual diagram of components of a speech-processing system 139 associating audio output commands with multiple devices, including a speechlet 907 configured to generate a command that the selected voice-enabled device uses to respond to a user utterance. As used with respect to FIG. 9, a voice-enabled device may include a voice-enabled device 102, such as described with respect to FIG. 1. As illustrated in FIG. 9, the speech-processing system 139, including the orchestration component 1024 comprising the ASR component 140 and the NLU component 142, may be coupled to the targeting component 1034 and provide the targeting component 1034 with the intent determined to be expressed in the user utterance. Further, the arbitration component 1030 may provide the ranked list of devices to the targeting component 1034, as well as device indicators (e.g., IP addresses, devices names, etc.) for one or more of the voice-enabled devices in the ranked list of devices. The targeting component 1034 may then perform techniques to determine a target device (e.g., a device to perform the requested operation), and provide various data to the speechlet 907. For instance, the targeting component 1034 may provide the speechlet 907 with various device identifiers of the voice-enabled devices, the determined target device, the determined intent and/or command, etc.

The speechlet 907 and/or NLU component 142 may determine a domain based on the intent and, based on this determination, route the request corresponding to the audio data to the appropriate domain speechlet, such as the illustrated domain speechlets 146, 154, and/or 156. The domain speechlet 146, 154, and/or 156 may comprise any type of device or group of devices (e.g., hardware device, virtual devices or partitions, server, etc.), and may receive the text data and/or an intent associated with the audio signals and may determine how to respond to the request. For instance, the intent for a command "order room service" may be routed to a managed-property speechlet 148, which controls generation of directive data for sending to voice-enabled devices for outputting audio confirming an order for room service has been placed.

Various types of domain speechlets 156 may be used to determine which devices to send commands to and/or to use in response to a user utterance, as well as the appropriate response and potential additional content (e.g., audio data). For example, the domain speechlets 156 may include a third party skills domain speechlet 156, which may handle intents associated with gaming, productivity, etc., a music domain speechlet 156, which may handle intents associated with music play requests (e.g., Amazon Music, Pandora, Spotify, iHeart, etc.), and/or an information domain speechlet 156, which may handle requests for information associated, for example, with the status of a particular device and/or content being utilized and/or output by a particular device and/or group of devices.

After the domain speechlet 146, 154, and/or 156 generates the appropriate command, which may be described herein as directive data, based on the intent of the user, and/or provides additional content, such as audio data, to be output by one of the voice-enabled devices, the domain speechlet 146, 154, and/or 156 may provide this information back to the speech system 139, which in turns provides some or all of this information to a text-to-speech (TTS) engine 144. The TTS engine 144 then generates an actual audio file for outputting the second audio data determined by the domain speechlet 146, 148, and/or 156. After generating the file (or "audio data"), the TTS engine 144 may provide this data back to the speech system 139.

The speech system 139 may then publish (i.e., write) some or all of this information to an event bus 1046. That is, the speech system 139 may provide information regarding the initial request (e.g., the speech, the text, the domain/intent, etc.), the response to be provided to the voice-enabled device, or any other information pertinent to the interaction between the voice-enabled device and the speech-processing system 139 to the event bus 1046.

Within the speech-processing system 139, one or more components or services may subscribe to the event bus 1046 so as to receive information regarding interactions between user devices and the speech-processing system 139. In the illustrated example, for instance, the device management component 1048 may subscribe to the event bus 1046 and, thus, may monitor information regarding these interactions. In some examples, monitoring information in the event bus 1046 may comprise messages between various components of the speech-processing system 139. For example, the targeting component 1034 may monitor the event bus 1046 to identify device state data for voice-enabled devices. In some examples, the event bus 1046 may "push" or send indications of events and/or device state data to the targeting component 1034. Additionally, or alternatively, the event bus 1046 may be "pulled" where the targeting component 1034 sends requests to the event bus 1046 to provide an indication of device state data for a voice-enabled device. The event bus 1046 may store indications of the device states for the devices, such as in a database (e.g., user registry 138), and using the stored indications of the device states, send the device state data for voice-enabled devices to the targeting component 1034. Thus, to identify device state data for a device, the targeting component 1034 may send a request to the event bus 1046 (e.g., event component) to provide an indication of the device state data associated with a device, and receive, from the event bus 1046, the device state data that was requested.

The device management component 1048 functions to monitor information published to the event bus 1046 and identify events that may trigger action. For instance, the device management component 1048 may identify (e.g., via filtering) those events that: (i) come from voice-enabled devices that are associated with secondary device(s) (e.g., have secondary devices in their environments such as televisions, personal computing devices, accessory devices, etc.), and (ii) are associated with supplemental content (e.g., image data, video data, etc.). The device management component 1048 may reference the user registry 138 to determine which voice-enabled devices are associated with secondary devices, as well as determine device types, states, and other capabilities of these secondary devices. For instance, the device management component 1048 may determine, from the information published to the event bus 1046, an identifier associated with the voice-enabled device making the corresponding request or the voice-enabled device selected to respond to or act upon the user utterance. The device management component 1048 may use this identifier to identify, from the user registry 138, a user account associated with the voice-enabled device. The device management component 1048 may also determine whether any secondary devices have been registered with the identified user account, as well as capabilities of any such secondary devices, such as how the secondary devices are configured to communicate (e.g., via WiFi, short-range wireless connections, etc.), the type of content the devices are able to output (e.g., audio, video, still images, flashing lights, etc.), and the like.

The device management component 1048 may determine whether a particular event identified is associated with supplemental content. That is, the device management component 1048 may write, to a datastore, indications of which types of events and/or which primary content or responses are associated with supplemental content. In some instances, the speech-processing system 139 may provide access to third-party developers to allow the developers to register supplemental content for output on secondary devices for particular events and/or primary content. For example, if a voice-enabled device is to output that the weather will include thunder and lightning, the device management component 1048 may store an indication of supplemental content such as thunder sounds, pictures/animations of lightning and the like. In another example, if a voice-enabled device is outputting information about a particular fact (e.g., "a blue whale is the largest mammal on earth . . . "), then a secondary device, such as television, may be configured to provide supplemental content such as a video or picture of a blue whale. In another example, if a voice-enabled device is outputting audio, then a second device, such as a speaker, may be configured to also output the audio based at least in part on a user utterance representing a request to add the secondary device to the audio session. In these and other examples, the device management component 1048 may store an association between the primary response or content (e.g., outputting of information regarding the world's largest mammal) and corresponding supplemental content (e.g., the audio data, image data, or the like). In some instances, the device management component 1048 may also indicate which types of secondary devices are to output which supplemental content. For instance, in the instant example, the device management component 1048 may store an indication that secondary devices of a class type "tablet" are to output a picture of a blue whale. In these and other instances, meanwhile, the device management component 1048 may store the supplemental content in association with secondary-device capabilities (e.g., devices with speakers output the audio commentary, devices with screens output the image, etc.).

The device management component 1048 may also determine how to transmit response and/or supplement content (and/or information acquiring the content) to the voice-enabled devices and/or the secondary devices. To make this determination, the device management component 1048 may determine a device type of the voice-enabled devices and/or secondary devices, capabilities of the device(s), or the like, potentially as stored in the user registry 138. In some instances, the device management component 1048 may determine that a particular device is able to communicate directly with the speech-processing system 139 (e.g., over WiFi) and, thus, the device management component 1048 may provide the response and/or content directly over a network 122, 158 to the secondary device (potentially via the speech system 139). In another example, the device management component 1048 may determine that a particular secondary device is unable to communicate directly with the speech-processing system 139, but instead is configured to communicate with a voice-enabled device in its environment over short-range wireless networks. As such, the device management component 1048 may provide the supplement content (or information) to the speech system 139, which in turn may send this to the voice-enabled device, which may send the information over a short-range network to the secondary device.

The speech-processing system 139 may further include the user registry 138 that includes data regarding user profiles as described herein. The user registry 138 may be located part of, or proximate to, the speech-processing system 139, or may otherwise be in message with various components, for example over the network 122, 158. The user registry 138 may include a variety of information related to individual users, accounts, etc. that interact with the voice-enabled devices, and the speech-processing system 139. For illustration, the user registry 138 may include data regarding the devices associated with particular individual user profiles. Such data may include user or device identifier (ID) and internet protocol (IP) address information for different devices as well as names by which the devices may be referred to by a user. Further qualifiers describing the devices may also be listed along with a description of the type of object of the device. Further, the user registry 138 may store indications of associations between various voice-enabled devices and/or secondary device, such as virtual clusters of devices, states of devices, and associations between devices and audio-session queues. The user registry 138 may represent clusters of devices and/or as single devices that can receive commands and disperse the commands to each device and/or in the cluster. In some examples, the virtual cluster of devices may be represented as a single device which is determined as being capable, or not capable (e.g., offline), of performing a command in a user utterance. A virtual cluster of devices may generally correspond to a stored grouping of devices, or a stored association between a group of devices.

In some examples, the device state for devices associated with a user account may indicate a current state of the device. In this way, the speechlet 907 and/or the domain speechlets 146, 154, and/or 156 may determine, based on the stored device states in the user registry 138, a current device state of the voice-enabled devices. Rather than receiving device states for the voice-enabled devices, in metadata, the device states may already have been determined or received and stored in the user registry 138. Further, the user registry 138 may provide indications of various permission levels depending on the user. As an example, the speech system 139 may perform speaker recognition on audio signals to determine an identity of the speaker. If the speaker is a child, for instance, the child profile may have permission restrictions where they are unable to request audio to be output via certain devices and/or to output certain audio on one or more of the devices, for example. Conversely, a parent profile may be able to direct output of audio without restrictions.

In some examples, to determine the device state, the event bus 1046 may publish different events which indicate device states to various entities or components that subscribe to the event bus 1046. For instance, if an event of "play Song A" occurs for a voice-enabled device, the event bus 1046 may publish the indication of this event, and thus the device state of the voice-enabled device from which the audio data was received may be determined. Thus, various components, such as the targeting component 1034, may be provided with indications of the various device states via the event bus 1046. The event bus 1046 may further store and/or update device states for the voice-enabled devices in the user registry 138. The components of the speech-processing system 139 may query the user registry 138 to determine device states.

A particular user profile may include a variety of data that may be used by the system 139. For example, a user profile may include information about what voice-enabled devices are associated with the user and/or user profile. The user profile may further indicate an IP address for each of the devices associated with the user and/or user profile, user IDs for the devices, indications of the types of devices, and current device states for the devices.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   storing first data indicating that a voice-enabled device is associated with a first account and a second account, wherein the first account differs from the second account;

receiving an indication that a dissociation event has occurred for the voice-enabled device;

dissociating, based at least in part on the indication, the voice-enabled device from the second account; and storing, based at least in part on the dissociating, second data that removes an association between the second d account and the voice-enabled device and indicates that the voice-enabled device is associated with the first account, wherein the first data and the second data are different.

2. The method of claim 1, further comprising:

receiving audio data representing a user utterance;

determining, utilizing speech processing, that the user utterance indicates an intent to dissociate the second account from the voice-enabled device; and wherein the indication is based at least in part on the user utterance indicating the intent to dissociate the second account from the voice-enabled device.

3. The method of claim 1, further comprising:

detecting presence of a user device associated with the second account within an environment in which the voice-enabled device is disposed;

determining that the presence of the user device ceases to be detected within the environment; and wherein the indication is based at least in part on the presence of the user device ceasing to be detected.

4. The method of claim 1, further comprising:

detecting, based at least in part on audio data received in association with an environment in which the voice-enabled device is disposed, presence of a user associated with the second account;

determining that the presence of the user ceases to be detected within the environment; and wherein the indication is based at least in part on the presence of the user ceasing to be detected.

5. The method of claim 1, further comprising:

prior to receiving the indication, receiving audio data representing a user utterance; and causing an action to be performed in association with the voice-enabled device based at least in part on the user utterance.

6. The method of claim 1, further comprising:

receiving audio data representing a user utterance;

based at least in part on the voice-enabled device being associated with the first account and the second account, determining that characteristics of the audio data are associated with a user of the second account; and selecting, based at least in part on the characteristics being associated with the user of the second account, an action to be performed by the voice-enabled device utilizing the second account instead of the first account.

7. The method of claim 1, further comprising:

receiving, after dissociating the voice-enabled device from the second account, audio data representing a user utterance requesting output of personal information associated with the first account;

determining that the voice-enabled device is associated with the first account and is dissociated from one or more other accounts including the second account when the audio data is received; and causing the voice-enabled device to output the personal information based at least in part on the voice-enabled device being dissociated from the one or more other accounts.

8. The method of claim 1, further comprising:

determining that the voice-enabled device has transitioned from a first mode, when the first data was stored, to a second mode;

determining that the second mode is associated with the dissociation event; and wherein the indication is based at least in part on the voice-enabled device transitioning from the first mode to the second mode.

9. The method of claim 1, further comprising:

receiving, prior to dissociation of the voice-enabled device from the second account, user input data requesting an action be performed by the voice-enabled device;

determining that the action is permitted to be performed in association with accounts other than the first account; and causing the action to be performed based at least in part on the action being permitted to be performed in association with the accounts other than the first account.

10. The method of claim 1, further comprising:

receiving, after dissociating the voice-enabled device from the second account, user input data to perform an action;

determining that the action is associated with the second account; and determining to refrain from performing the action based at least in part on the second data indicating the voice-enabled device is unassociated with the second account.

11. A system comprising:

one or more processors; and non-transitory computer-readable media storing instructions that, when executed by the one or more processors, cause the one or more processors to perform operations comprising:

storing first data indicating that a voice-enabled device is associated with a first account and a second account, wherein the first account differs from the second account;

receiving an indication that a dissociation event has occurred for the voice-enabled device;

dissociating, based at least in part on the indication, the voice-enabled device from the second account; and storing, based at least in part on the dissociating, second data that removes an association between the second account and the voice-enabled device and indicates that the voice-enabled device is associated with the first account, wherein the first data and the second data are different.

12. The system of claim 11, the operations further comprising:

receiving audio data representing a user utterance;

determining, utilizing speech processing, that the user utterance indicates an intent to dissociate the second account from the voice-enabled device; and wherein the indication is based at least in part on the user utterance indicating the intent to dissociate the second account from the voice-enabled device.

13. The system of claim 11, the operations further comprising:

detecting presence of a user device associated with the second account within an environment in which the voice-enabled device is disposed;

determining that the presence of the user device ceases to be detected within the environment; and wherein the indication is based at least in part on the presence of the user device ceasing to be detected.

14. The system of claim 11, the operations further comprising:
   detecting, based at least in part on audio data received in association with an environment in which the voice-enabled device is disposed, presence of a user associated with the second account;
   determining that the presence of the user ceases to be detected within the environment; and
   wherein the indication is based at least in part on the presence of the user ceasing to be detected.

15. The system of claim 11, the operations further comprising:
   prior to receiving the indication, receiving audio data representing a user utterance; and
   causing an action to be performed in association with the voice-enabled device based at least in part on the user utterance.

16. The system of claim 11, the operations further comprising:
   receiving audio data representing a user utterance;
   based at least in part on the voice-enabled device being associated with the first account and the second account, determining that characteristics of the audio data are associated with a user of the second account; and
   selecting, based at least in part on the characteristics being associated with the user of the second account, an action to be performed by the voice-enabled device utilizing the second account instead of the first account.

17. The system of claim 11, the operations further comprising:
   receiving, after dissociating the voice-enabled device from the second account, audio data representing a user utterance requesting output of personal information associated with the first account;
   determining, when the audio data is received, that the voice-enabled device is associated with the first account and is dissociated from one or more other accounts including the second account; and
   causing the voice-enabled device to output the personal information based at least in part on the voice-enabled device being dissociated from the one or more other accounts.

18. The system of claim 11, the operations further comprising:
   determining that the voice-enabled device has transitioned from a first mode, when the first data was stored, to a second mode;
   determining that the second mode is associated with the dissociation event; and
   wherein the indication is based at least in part on the voice-enabled device transitioning from the first mode to the second mode.

19. The system of claim 11, the operations further comprising:
   receiving, prior to dissociation of the voice-enabled device from the second account, user input data requesting an action be performed by the voice-enabled device;
   determining that the action is permitted to be performed in association with accounts other than the first account; and
   causing the action to be performed based at least in part on the action being permitted to be performed in association with the accounts other than the first account.

20. The system of claim 11, the operations further comprising:
   receiving, after dissociating the voice-enabled device from the second account, user input data to perform an action;
   determining that the action is associated with the second account; and
   determining to refrain from performing the action based at least in part on the second data indicating the voice-enabled device is unassociated with the second account.

* * * * *